(12) United States Patent
Hiraguchi

(10) Patent No.: US 8,955,782 B2
(45) Date of Patent: Feb. 17, 2015

(54) TAPE GUIDING MEMBER

(71) Applicant: FUJIFILM Corporation, Minato-ku, Tokyo (JP)

(72) Inventor: Kazuo Hiraguchi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/851,103

(22) Filed: Mar. 27, 2013

(65) Prior Publication Data

US 2013/0206890 A1   Aug. 15, 2013

Related U.S. Application Data

(63) Continuation of application No. PCT/JP2011/068806, filed on Aug. 19, 2011.

(30) Foreign Application Priority Data

Sep. 29, 2010 (JP) .................................. 2010-219661

(51) Int. Cl.
*G03B 23/02* (2006.01)
*G11B 23/04* (2006.01)
(Continued)

(52) U.S. Cl.
CPC ........ *G11B 23/08757* (2013.01); *G11B 23/044* (2013.01); *G11B 23/047* (2013.01); *G11B 15/60* (2013.01)
USPC ..................................... 242/346.2; 242/615.2

(58) Field of Classification Search
CPC ................................ B65H 23/04; B65H 23/02
USPC ........ 242/346, 346.2, 548, 548.1, 548.2, 566, 242/615, 615.2
See application file for complete search history.

(56) References Cited

U.S. PATENT DOCUMENTS

| 7,401,633 B2* | 7/2008 | Hatano ......................... 156/358 |
| 2003/0075582 A1 | 4/2003 | Dinhobl |
| 2003/0218092 A1 | 11/2003 | Anderson et al. |

(Continued)

FOREIGN PATENT DOCUMENTS

| JP | H06-60496 A | 3/1994 |
| JP | 2002109799 A | 4/2002 |

(Continued)

OTHER PUBLICATIONS

Written Opinion of the ISA issued in International Application No. PCT/JP2011/068806 on Aug. 19, 2011.

(Continued)

*Primary Examiner* — Emmanuel M Marcelo
*Assistant Examiner* — Angela Caligiuri
(74) *Attorney, Agent, or Firm* — Solaris Intellectual Property Group, PLLC

(57) ABSTRACT

There is provided a tape guiding member including: a hub around which a recording tape is wound or is trained; a flange main body that is provided at the hub, and that restricts a position in a transverse direction of the recording tape; a tape contacting layer that is formed in a shape of a sheet of a material that is different from a material that structures the flange main body, and that is superposed on a surface, at the recording tape side, of the flange main body; and a holding portion that is provided at the flange main body, and covers an outer peripheral edge portion of the tape contacting layer from the recording tape side, and holds the tape contacting layer at the flange main body.

17 Claims, 13 Drawing Sheets

(51) Int. Cl.
 *G11B 23/087* (2006.01)
 *G11B 15/60* (2006.01)

(56) References Cited

U.S. PATENT DOCUMENTS

2005/0035241 A1 2/2005 Nakao et al.
2008/0174912 A1* 7/2008 Shiga ........................... 360/134

FOREIGN PATENT DOCUMENTS

| JP | 2005063565 A | 3/2005 |
|----|--------------|--------|
| JP | 2008-159237 A | 7/2008 |
| JP | 2008-217900 A | 9/2008 |

OTHER PUBLICATIONS

International Search Report issued in International Application No. PCT/JP2011/068806 on Aug. 19, 2011.

* cited by examiner

TAPE GUIDING MEMBER

CROSS-REFERENCE TO RELATED APPLICATIONS

This application is a continuation application of International Application No. PCT/JP/2011/068806, filed Aug. 19, 2011, which is incorporated herein by reference, in its entirety. Further, this application claims priority from Japanese Patent Application No. 2010-219661, filed Sep. 29, 2010, which is incorporated herein by reference, in its entirety.

BACKGROUND

1. Technical Field

The present invention relates to a tape guiding member around which a recording tape is wound or trained.

2. Related Art

A reel, at which correcting bodies made of metal are superposed on the tape side surfaces of flanges made of resin, is known (see, for example, Japanese Patent Application Laid-Open No. 2008-217900). Further, there is known a tape cartridge in which a restricting sheet is disposed between the edge of a tape, that is wound around a hub, and a restricting body that is held at the case (see, for example, Japanese Patent Application Laid-Open No. 2008-159237).

By the way, when tape contacting layers, that are structured from a material that is different than flange main bodies, are provided at the tape side surfaces of the flange main bodies, there is the need for measures with respect to the structures that hold these tape contacting layers at the flange main bodies.

SUMMARY

An object of the present invention is to provide a tape guiding member that can prevent or effectively suppress the peeling-off of a tape contacting layer that is provided at a flange main body.

A tape guiding member relating to a first aspect of the present invention includes: a hub around which a recording tape is wound or is trained; a flange main body that is provided at the hub, and that restricts a position in a transverse direction of the recording tape; a tape contacting layer that is formed in a shape of a sheet of a material that is different from a material that structures the flange main body, and that is superposed on a surface, at the recording tape side, of the flange main body; and a holding portion that is provided at the flange main body, and covers an outer peripheral edge portion of the tape contacting layer from the recording tape side, and holds the tape contacting layer at the flange main body.

In accordance with this aspect, the position in the transverse direction of the recording tape, that is wound around or trained around the hub, is restricted by the flange (the recording tape is guided at the necessary traveling path). At this time, the tape contacting layer that is provided at the flange main body contacts the edge of the recording tape. Accordingly, for example, if the tape contacting layer is structured of a material that is soft as compared with the flange main body, the ability to protect the edge of the recording tape improves.

Here, at the present tape guiding member, the outer peripheral edge portion of the tape contacting layer, that is formed in the shape of a sheet, is covered from the recording tape side by the holding portion that is provided at the flange main body. In other words, the outer peripheral edge portion of the tape contacting layer is nipped, in the thickness direction, by the flange main body and the holding portion. Therefore, in a structure having the tape contacting layer that is formed of a material that is different (a different type) than the material that structures the flange, the tape contacting layer peeling-off from the flange main body due to contact with the tape that travels is prevented or effectively suppressed.

In this way, at the tape guiding member of the above-described aspect, peeling-off of the tape contacting layer that is provided at the flange main body can be prevented or effectively suppressed. Note that a reel at which a recording tape is wound around a hub, a tape guide (a flanged roller) at which a recording tape is trained around a hub, and the like can be given as examples of the tape guiding member.

The tape guiding member of the above-described aspect may be structured such that, at the outer peripheral edge portion of the tape contacting layer, the flange main body side has a larger diameter than the recording tape side, and the holding portion is provided within a range of a thickness of the tape contacting layer.

In accordance with this aspect, the outer peripheral edge portion of the tape contacting layer is made to be, for example, a taper shape or a stepped shape, and a holding portion covers this portion from the recording tape side. Due thereto, the holding portion achieves its function within the range of the thickness of the tape contacting layer. Therefore, in the present tape guiding member, in a structure in which the flange main body rotates integrally with the hub, contact between the holding portion and the recording tape can be prevented or effectively suppressed.

The tape guiding member of the above-described aspect may be structured such that the outer peripheral edge portion of the tape contacting layer is made to be a bent portion that is bent in a direction of moving away from the recording tape side, and the holding portion holds the tape contacting layer at the flange main body by covering the bent portion of the tape contacting layer from the recording tape side.

In accordance with this aspect, the outer peripheral edge portion of the tape contacting layer is made to be a bent portion, and the holding portion covers this bent portion from the recording tape side. Due thereto, the holding portion can be provided without projecting-out toward the recording tape side, with respect to portions other than the bent portion of the tape contacting layer. Therefore, in the present tape guiding member, in a structure in which the flange main body rotates integrally with the hub, contact between the holding portion and the recording tape can be prevented or effectively suppressed.

The tape guiding member of the above-described aspect may be structured such that a concave portion, that is formed by recessing the tape contacting layer, is formed continuously or intermittently along a peripheral direction, adjacent to a radial direction inner side of the holding portion.

In accordance with this aspect, because the concave portion, that recesses the tape contacting layer, is formed at the inner peripheral side of the holding portion, the holding portion securely covers the outer peripheral edge portion of the tape contacting layer, and holds the outer peripheral edge portion of the tape contacting layer with respect to the flange main body.

The tape guiding member of the above-described aspect may be structured such that the holding portion covers the outer peripheral edge portion of the tape contacting layer from the recording tape side over an entire periphery.

In accordance with this aspect, the outer peripheral edge portion of the tape contacting layer is covered by the holding portion from the recording tape side over the entire periphery. Therefore, contact itself between the outer peripheral edge of the tape contacting layer and the recording tape edge, which are in a state in which it is easy to cause peeling-off of the tape contacting layer from the flange main body, can be prevented or effectively suppressed.

The tape guiding member of the above-described aspect may be structured such that the flange main body is structured of a resin material, and the holding portion is formed integrally with the flange main body of a resin material of a same type as the flange main body.

In accordance with this aspect, the holding portion is formed integrally with the flange main body of the same type of resin material as the flange main body. Therefore, the tape guiding member can be manufactured easily and with good accuracy, by, for example, setting the tape contacting layer that is in the shape of a sheet in a mold and injection molding the flange main body, or the like.

The tape guiding member of the above-described aspect may be structured such that through-holes are formed in a portion, that is covered by the holding portion, of the tape contacting layer, and the resin material that structures the flange main body is placed in the through-holes.

In accordance with this aspect, the resin material that structures the flange main body is placed into the through-holes that are formed at the portion, that is covered by the holding portion, at the tape contacting layer. Due thereto, the flange main body and the holding portion are connected by the resin material that has been placed in the through-holes. Therefore, the tape contacting layer is held more securely at the flange main body at that peripheral edge portion.

The tape guiding member of the above-described aspect may be structured such that an inner peripheral edge portion of the tape contacting layer is nipped, in a thickness direction, between an axial direction end surface of the hub and the flange main body.

In accordance with this aspect, the inner peripheral edge portion of the tape contacting layer is nipped and held between an axial direction end surface of the hub and the flange main body. Therefore, in the present tape guiding member, peeling-off of the tape contacting layer, that is provided at the flange main body, from the inner peripheral side as well can be prevented or effectively suppressed.

The tape guiding member of the above-described aspect may be structured such that the hub and the flange main body are formed as separate bodies and are joined to one another, and the tape guiding member further comprises a spacer portion that defines an interval in the thickness direction between the axial direction end surface of the hub and the flange main body in a state in which the hub and the flange main body are joined, to be equal to a thickness of the tape contacting layer.

In accordance with this aspect, the inner peripheral edge portion of the tape contacting layer is nipped and held between an axial direction end surface of the hub and the flange main body that is joined to this hub. Here, the interval between the nipped-in region of the tape contacting layer, and the hub and the flange main body is defined, by the spacer portion, to be equal to the thickness of the tape contacting layer. Therefore, the dimensional accuracy of the tape contacting layer is easily ensured, without the tape contacting layer being crushed partially due to the joining load of the hub and the flange main body.

The tape guiding member of the above-described aspect may be structured so as to further comprise a fixing portion that is provided at the flange main body, and that fixes the tape contacting layer to the flange main body by entering into through-holes that pass-through the tape contacting layer passingly in a thickness direction.

In accordance with this aspect, the tape contacting layer is held at the flange main body by, in addition to the holding portion, also the fixing portion that passes-through that tape contacting layer. Due thereto, at the present tape guiding member, peeling-off of the tape contacting layer that is provided at the flange main body can be prevented or more effectively suppressed.

A tape guiding member relating to a second aspect of the present invention comprises: a hub around which a recording tape is wound or is trained; a flange main body that is provided at the hub, and that restricts a position in a transverse direction of the recording tape; a tape contacting layer that is formed in a shape of a sheet of a material that is different from a material that structures the flange main body, and that is superposed on a surface, at the recording tape side, of the flange main body; and a fixing portion that is provided at the flange main body, and that fixes the tape contacting layer to the flange main body by entering into through-holes that pass-through the tape contacting layer in a thickness direction.

In accordance with this aspect, the position in the transverse direction of the recording tape, that is wound around or trained around the hub, is restricted by the flange (the recording tape is guided at the necessary traveling path). At this time, the tape contacting layer that is provided at the flange main body contacts the edge of the recording tape. Accordingly, for example, if the tape contacting layer is structured of a material that is soft as compared with the flange main body, the ability to protect the edge of the recording tape improves.

Here, at the present tape guiding member, the tape contacting layer is fixed to the flange main body by the fixing portion that has been placed in the through-holes that pass through the tape contacting layer that is formed in the shape of a sheet. Therefore, in a structure having the tape contacting layer that is formed of a material that is different (a different type) than the material that structures the flange, the tape contacting layer peeling-off from the flange main body due to contact with the tape that travels is prevented or effectively suppressed.

In this way, at the tape guiding member of the above-described aspect, peeling-off of the tape contacting layer that is provided at the flange main body can be prevented or effectively suppressed. Note that a reel at which a recording tape is wound around a hub, a tape guide (a flanged roller) at which a recording tape is trained around a hub, and the like can be given as examples of the tape guiding member.

The tape guiding member of the above-described aspect may be structured such that the flange main body is structured of a resin material, and the fixing portion is formed integrally with the flange main body, of a same resin material as the flange main body.

In accordance with this aspect, the holding portion is formed integrally with the flange main body of the same type of resin material as the flange main body. Therefore, the tape guiding member can be manufactured easily and with good accuracy, by, for example, setting the tape contacting layer that is in the shape of a sheet in a mold and injection molding the flange main body, or the like.

The tape guiding member of the above-described aspect may be structured such that, at the tape contacting layer, at least a portion of hole walls of the through-holes are made to be an inclined portion or a stepped portion that faces toward the recording tape side, and the fixing portion is structured by a resin material that is filled into the holes.

In accordance with this aspect, a resin material is filled in so as to cover, from the recording tape side, the inclined portions or stepped portions at the hole walls of the through-holes. Due thereto, the fixing portion achieves its function within the range of the thickness of the tape contacting layer. Therefore, in the present tape guiding member, in a structure in which the flange main body rotates integrally with the hub, contact between the holding portion and the recording tape can be prevented or effectively suppressed.

As described above, the tape guiding member relating to the present invention has the excellent effect of being able to prevent or effectively suppress peeling-off of a tape contacting layer that is provided at a flange main body.

BRIEF DESCRIPTION OF THE DRAWINGS

Exemplary embodiments of the present invention will be described in detail based on the following figures, wherein.

DETAILED DESCRIPTION

Figure 1:
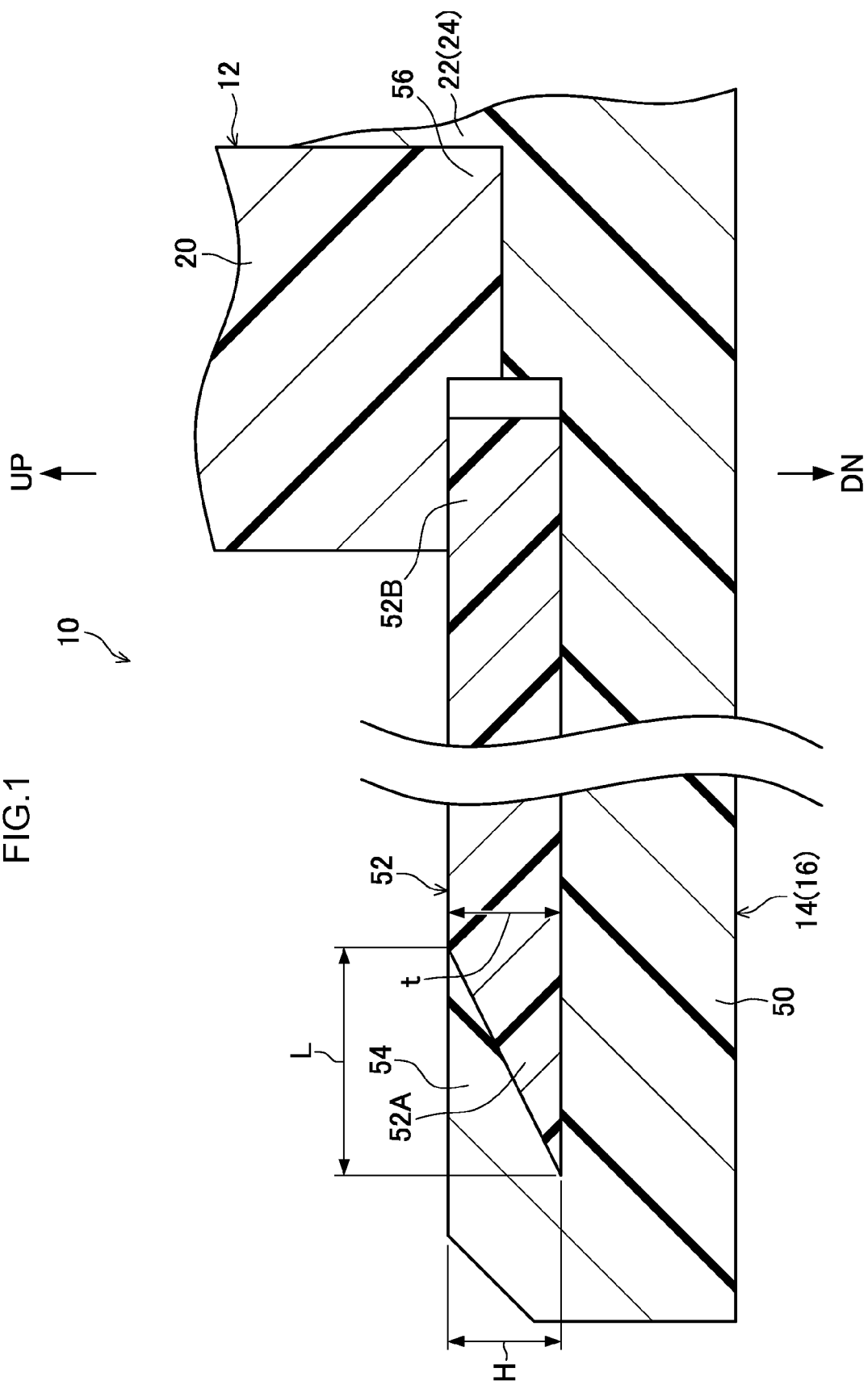
FIG. 1 is a cross-sectional view showing, in an enlarged manner, main portions of a reel relating to a first embodiment of the present invention.
Figure 2:
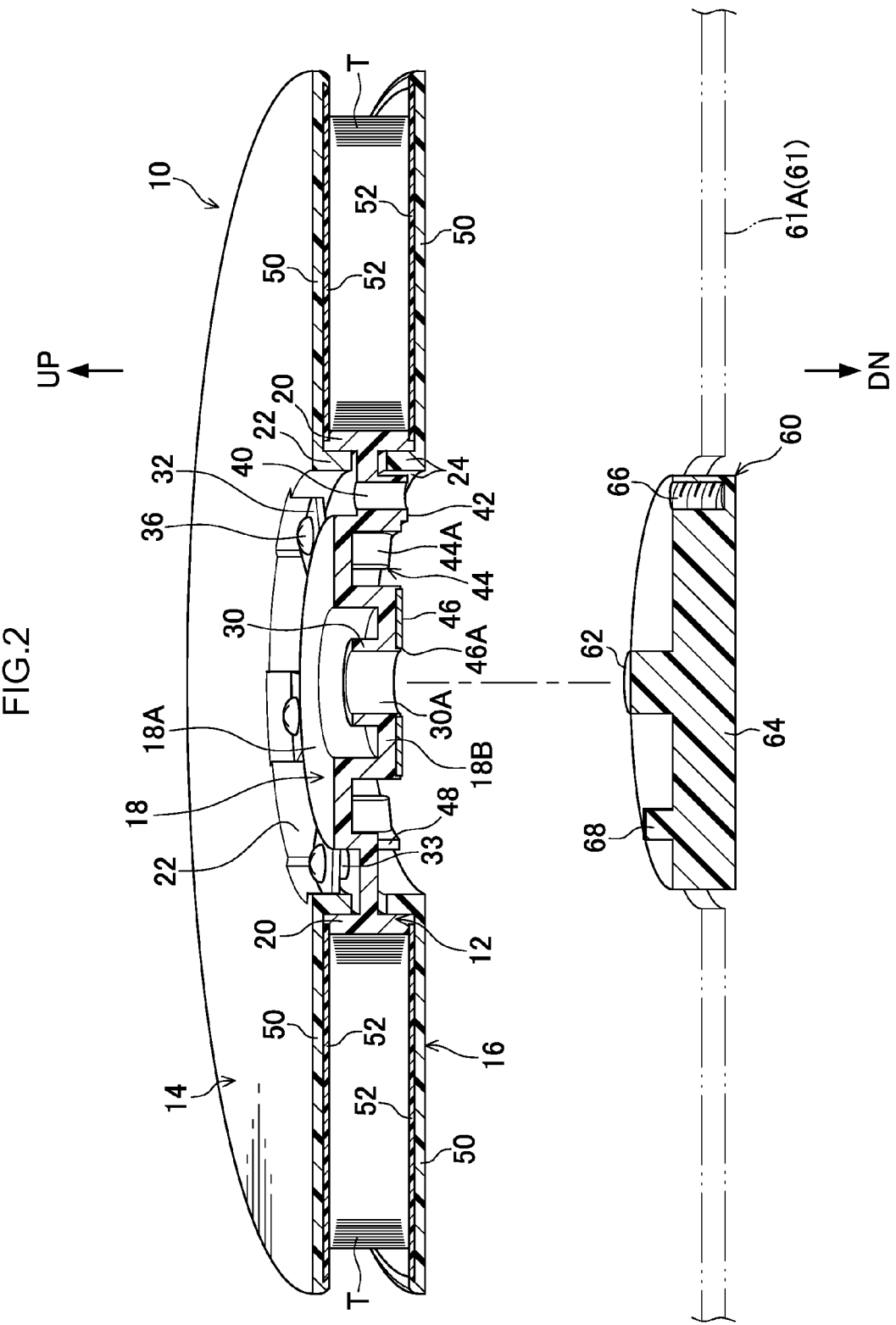
FIG. 2 is a cut view showing a state before joining of the reel relating to the first embodiment of the present invention and a rotating member of a drive device.

A reel 10, that serves as a tape guiding member, and a tape guide 80, that serves as a tape guiding member, that relate to a first embodiment of the present invention are described on the basis of FIG. 1 through FIG. 7. First, the schematic overall structure of a drive device 60, to which the reel 10 and the tape guide 80 are applied, is described, and then, detailed structures of the reel 10 and the tape guide 80 are described. Note that, for convenience of explanation, arrow UP in FIG. 2 is the upward direction, arrow DN is the downward direction, and the rotational axial direction of the reel 10 relating to the present embodiment is the vertical direction (height direction).

(Structure of Drive Device)

Figure 6:
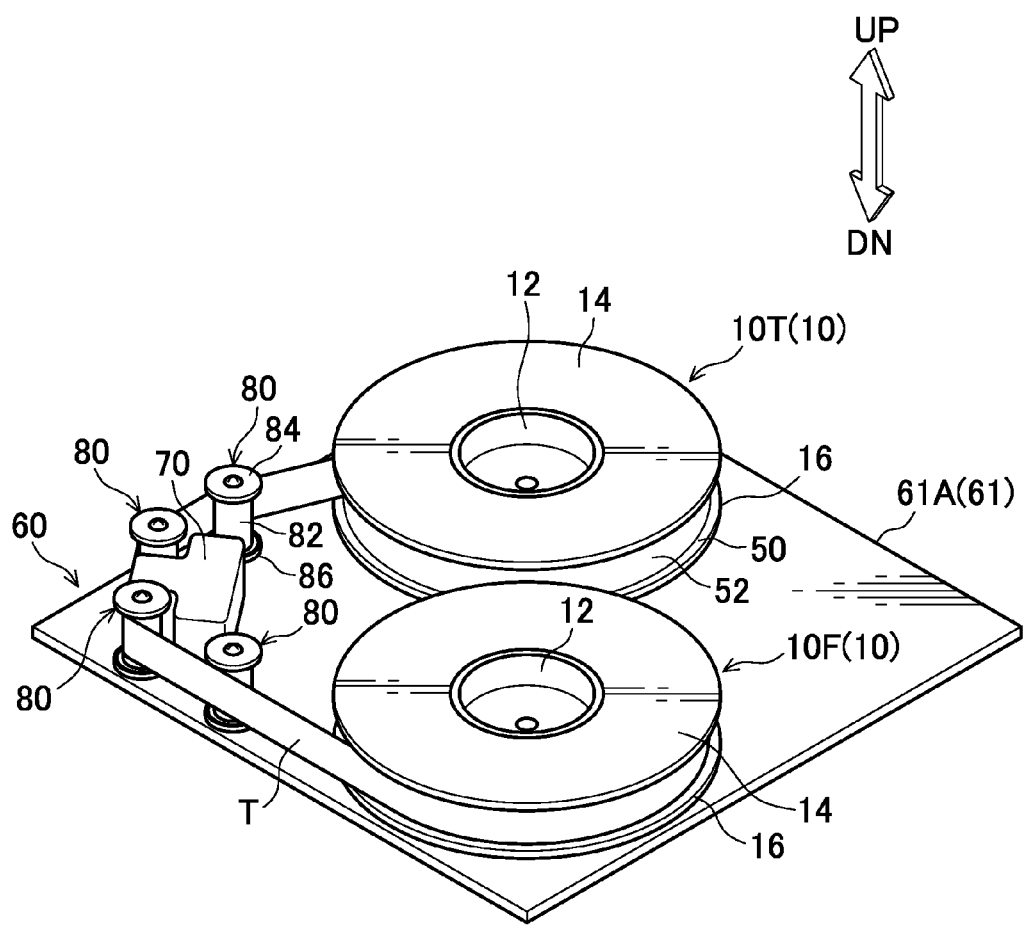
FIG. 6 is a perspective view showing the schematic overall structure of the drive device to which the reels and tape guides relating to the first embodiment of the present invention are applied.

As shown in FIG. 6, the drive device 60 has a casing 61. In FIG. 6, only a bottom plate 61A of the casing 61 is illustrated, but the casing 61 is formed on the whole in the shape of a flat box that is thin in the vertical direction. A pair of the reels 10 is provided within the casing 61 so as to be unable to be removed by users.

One of the reels 10 is a reel 10F for drawing-out of a recording tape T that is a magnetic tape or the like and that serves as an information recording/playback medium and is wound around a hub 12 of the reel 10. On the other hand, the other of the reels 10 is a reel 10T for take-up that takes-up, on the hub 12 thereof, the recording tape T that has been drawn-out from the reel 10F. Namely, the reel 10F and the reel 10T form a pair around which the common recording tape T is wound.

The plural tape guides 80 are provided within the casing 61, and define a traveling path of the recording tape T within the casing 61. A magnetic head 70 is provided at the central portion (the portion between adjacent two of the tape guides 80) of the traveling path of the recording tape T that is defined by the plural tape guides 80 at the casing 61 interior. The magnetic head 70 is structured to carry out at least one of recording (writing) of information with respect to the recording tape T and playback (reading-out) of information recorded on the recording tape T.

In the drive device 60 relating to this embodiment, the magnetic head 70 is structured so as to, while slidingly-contacting the recording tape T that travels on the aforementioned traveling path, be able to carry out recording of information onto that recording tape T, playback of information recorded on that recording tape T. Namely, the drive device 60 is a structure that carries out recording, playback of information with respect to the recording tape T that is incorporated therein, without replacing (the reels 10F, 10T on which are wound) the recording tape T.

(Structure of Reel)

The reels 10F, 10T have basically the same structure. Accordingly, in the following explanation, the reels 10F, 10T are called the reels 10 without differentiating therebetween, except when specially noted.

Figure 3:
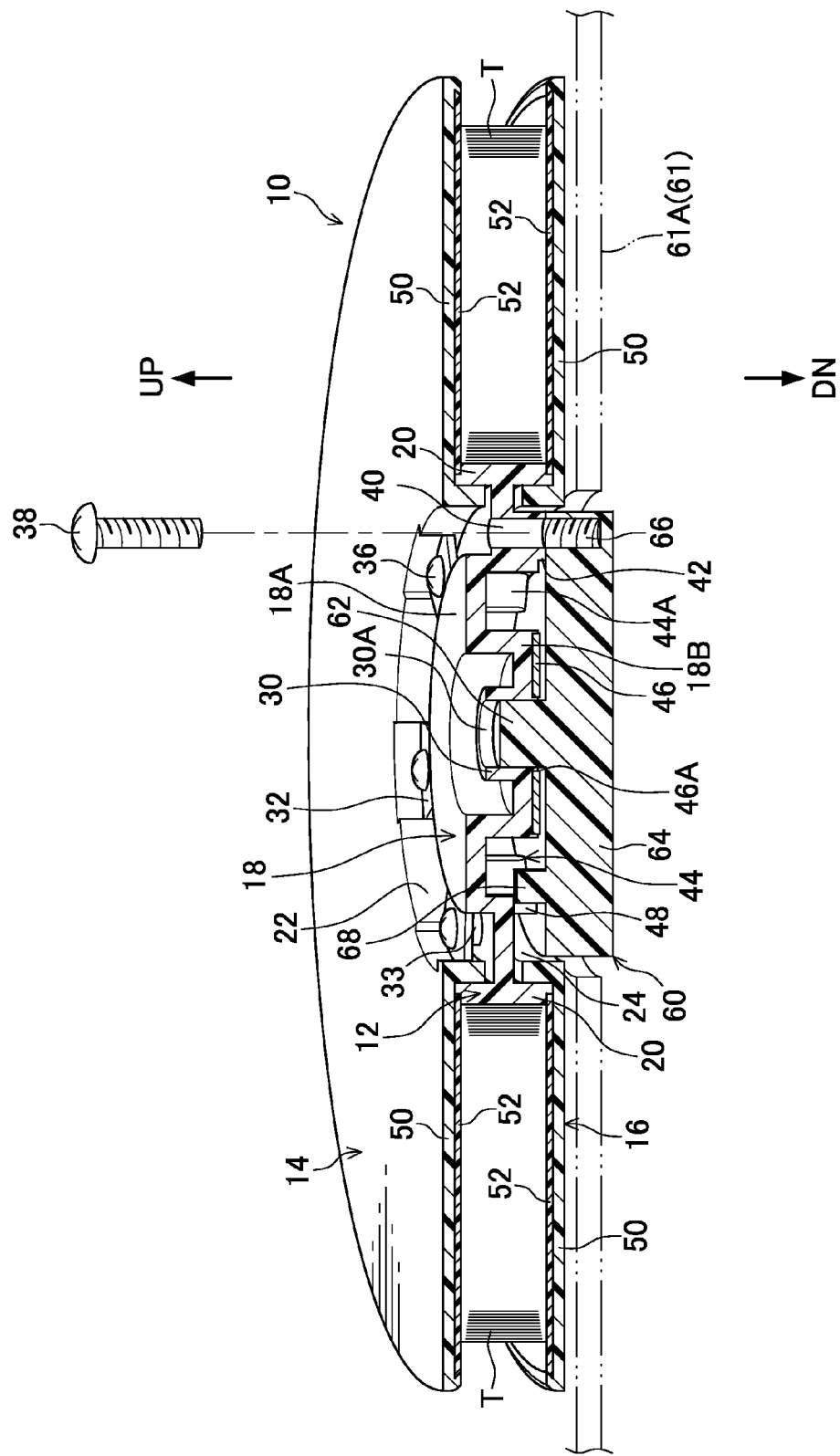
FIG. 3 is a cut view showing a joined state of the reel relating to the first embodiment of the present invention and the rotating member of the drive device.

Cut views of the reel 10 are shown in FIG. 2, FIG. 3. As shown in these drawings, the reel 10 has the hub 12 around which the recording tape T is wound, an upper flange 14 that is one of a pair of flanges, and a lower flange 16 that is the other of the pair of flanges. The upper flange 14 projects-out toward the radial direction outer side at an axial direction one end side of the hub 12, and the lower flange 16 projects-out toward the radial direction outer side at the axial direction other end side of the hub 12. The upper flange 14, the lower flange 16 are structured to restrict the positions of the transverse direction end portions of the recording tape T (guide the recording tape T) that is wound around the outer peripheral surface of a cylindrical tube portion 20 that structures the hub 12.

The hub 12 has a disc portion 18 that is provided at the inner side of the cylindrical tube portion 20. The disc portion 18 is structured to function as a flange joining portion to which the upper flange 14, the lower flange 16 are joined. Further, the disc portion 18 is structured to function as a drive driven portion that is driven by an unillustrated driving motor of the drive device 60, and as a winder driven portion that is driven to rotate in a step of winding the recording tape T around the cylindrical tube portion 20 before assembly into the drive device 60.

Concretely, plural screw bosses 33 are disposed at uniform intervals in the peripheral direction at the outer peripheral side portion of the disc portion 18. The screw bosses 33 (six in this embodiment) for upper flange 14 joining and the screw bosses 33 (six in this embodiment) for lower flange 16 joining are disposed so as to be offset in the peripheral direction as seen in plan view. Annular portions 22, 24, that are provided at the axially central portions of the upper flange 14, the lower flange 16, are internally fit together with the cylindrical tube portion 20, and projecting portions 32 that are flat-plate-shaped project-out toward the radial direction inner side from these annular portions 22, 24. The upper flange 14, the lower flange 16 are fixedly joined to the hub 12 due to screws 36, that are passed-through screw holes (not shown) of the annular portions 22, 24, being screwed-together with the screw bosses 33. Accordingly, in this embodiment, the upper flange 14 and the lower flange 16 rotate coaxially and integrally with the hub 12.

Further, plural (three in this embodiment) screw holes 40, that are for joining to a rotating member 64 that is rotated and driven by the unillustrated driving motor of the drive device 60, are formed at uniform intervals in the peripheral direction at the outer peripheral portion of the disc portion 18. In this embodiment, the respective screw holes 40 are disposed on a virtual arc that is common to the screw bosses 33. Accordingly, the screw holes 40 are disposed between specific screw bosses 33 at the upper flange 14 side and specific screw bosses 33 at the lower flange 16 side that are adjacent to those screw bosses 33 in the peripheral direction. The peripheries of the screw holes 40 are made to be bosses 42 that project-out downwardly.

Further, a central boss 30 that is formed in the shape of a tube is formed at the axially central portion of the disc portion 18. A projecting shaft portion 62, that projects-out from the axially central portion of the rotating member 64, is fit-together with a projecting-shaft hole 30A of the central boss 30. Due thereto, before the hub 12 is joined to the rotating member 64 by screws 38, centering (axial alignment) of the hub 12 with respect to that rotating member 64 is achieved. Moreover, a cut-out 48 that opens downward is formed at the bottom surface side of the disc portion 18. The cut-out 48 is a structure that, due to a convex portion 68 that projects-out from the rotating member 64 being placed into the cut-out 48, carries out positioning in the peripheral direction of the hub 12 with respect to that rotating member 64.

Further, in a state in which the bottom end surfaces of the respective bosses 42 are thrust against a top end surface (reference surface) of the rotating member 64, the screws 38 (see FIG. 3) that have passed-through the screw holes 40 are screwed-together with female screw portions 66 that are formed in the rotating member 64. Due thereto, the disc portion 18, i.e., the hub 12, is coaxially and fixedly joined to the rotating member 64. Accordingly, the reel 10 is a structure that is rotated and driven by operation of the driving motor of the drive device 60.

Further, the portion of the above-described disc portion 18, which portion is at the radial direction inner side of the region at which the screw holes 40 (the bosses 42) are formed and is at the radial direction outer side of the central boss 30, is formed as if an outer-side bag portion 18A that opens downward and an inner-side bag portion 18B that opens upward are provided continuously in the radial direction. A reel gear 44, with which is meshed-together a driving gear of a winder (winding device) that is used in the step of taking the recording tape T up onto the cylindrical tube portion 20, is formed at the inner side of the outer-side bag portion 18A. The reel 44 is structured by plural gear teeth 44A, that are formed so as to extend over a bottom plate portion and an annular wall at the radial direction outer side of the outer-side bag portion 18A, being disposed at uniform intervals in the peripheral direction.

On the other hand, a reel plate 46, that is formed in an annular form and of a magnetic metal, is fixed by insert molding to the bottom surface of the inner-side bag portion 18B. The axially central portion of the reel plate 46 is made to be a central hole 46A through which the projecting shaft portion 62 is inserted. In a state in which the reel gear 44 is meshed-together with the driving gear of the winding device, the reel plate 46 is attracted and held by a magnet of that winding device. In other words, due to the reel plate 46 being attracted and held by the magnet of the winding device, the reel gear 44 is maintained in a state of being meshed-together with the driving gear of the winding device.

Other than the reel plate 46, the screws 36, 38 and tape contacting layers 52 that are described later, the hub 12, the upper flange 14 and the lower flange 16 that structure the reel 10 are structured by a resin material such as, for example, polycarbonate (PC) or the like. Further, in order to improve the rigidity of the reel 10, portions of or the entireties of the hub 12, the upper flange 14 and the lower flange 16 may be structured by using a resin material such as PC or the like that is reinforced by reinforcing fibers such as, for example, carbon fibers or the like.

(Structure of Flange)

The upper flange 14, the lower flange 16 that structure the above-described reel 10 are each structured by the tape contacting layer 52 being provided at the recording tape T side surface of a flange main body 50.

The flange main body 50 can be interpreted as the portion that projects-out toward the radial direction outer side from the upper end of the annular portion 22 at the upper flange 14, the portion that projects-out toward the radial direction outer side from the lower end of the annular portion 24 at the lower flange 16. Namely, the flange main body 50 is interpreted as not only the portion that restricts the recording tape T that is wound around the hub 12, but also includes the portion that overlaps with an axial direction end surface of the cylindrical tube portion 20.

Figure 4:
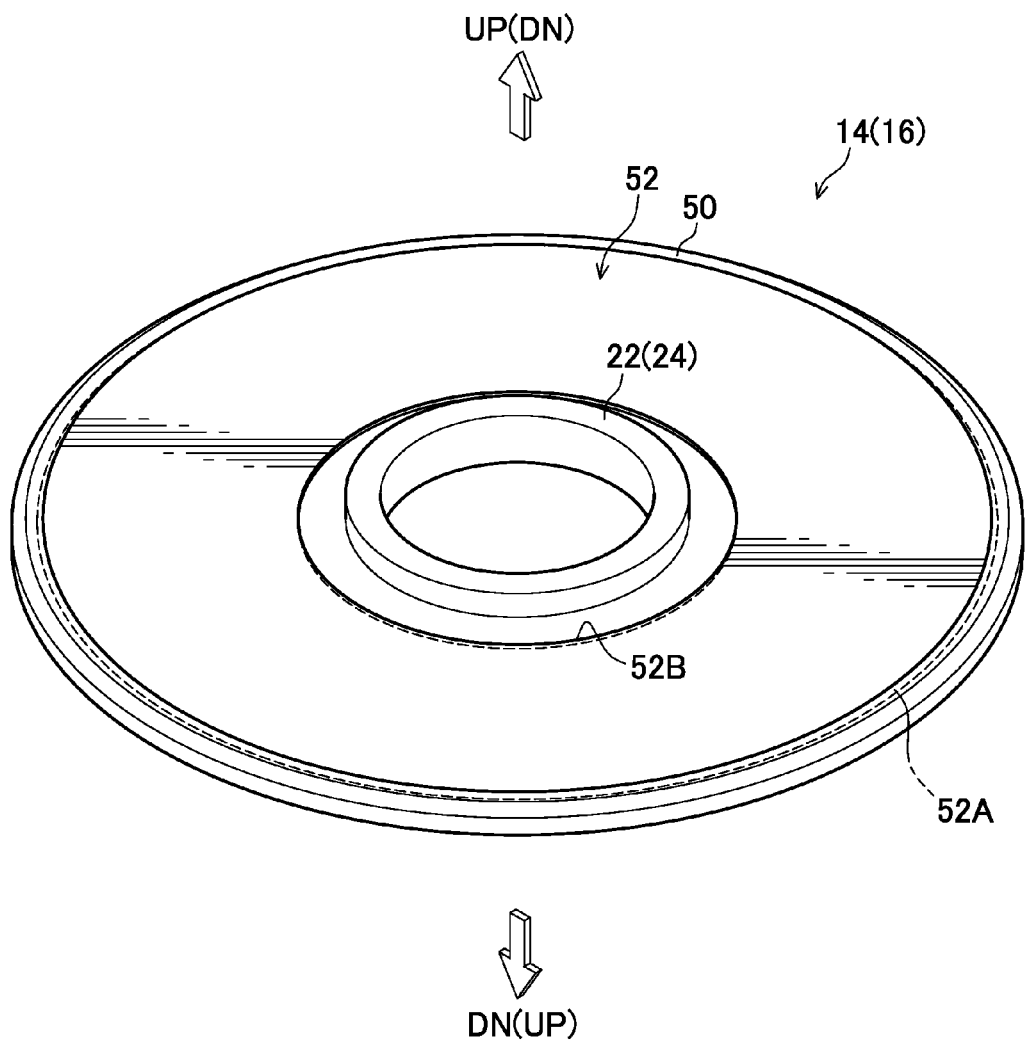
FIG. 4 is a perspective view of a flange that structures the reel relating to the first embodiment of the present invention.

The outer diameters of the flange main body 50 and the tape contacting layer 52 are respectively larger diameters than the outer diameter of the recording tape T in a case in which the entire length of the recording tape T is wound around the cylindrical tube portion 20. Further, the inner diameter of the tape contacting layer 52 is a smaller diameter than the outer diameter of the cylindrical tube portion 20. Accordingly, as shown in FIG. 4, the tape contacting layer 52 is disposed in a wide range, that includes the region at which the recording tape T is wound, at the upper flange 14, the lower flange 16.

This tape contacting layer 52 is structured by an annular sheet material, that is formed of a resin material that is flexible as compared with the resin material (PC or the like) that structures the flange main body 50, being held at the flange main body 50. The sheet material that structures the tape contacting layer 52 can be made to be, for example, an ultra-high molecular weight polyethylene (PE). This resin material is not compatible with the resin material (PC or the like) that structures the flange main body 50. A thickness t of the sheet material that structures the tape contacting layer 52 in this embodiment is greater than or equal to 0.5 mm, and preferably greater than or equal to 0.8 mm. Note that the thickness of the flange main body 50 is greater than or equal to 1 mm. In this embodiment, the total thickness of each of the upper flange 14, the lower flange 16 is made to be around 1.8 mm to 2.5 mm. Hereinafter, the structure of holding the tape contacting layer 52 with respect to the flange main body 50 is described.

As shown in FIG. 1, the outer peripheral edge portion of the tape contacting layer 52 is made to be a taper portion 52A whose outer diameter is a smaller diameter at the recording tape T side than at the flange main body 50 side. The taper portion 52A faces both the recording tape T side and the radial direction outer side. A length L in the radial direction of the taper portion 52A is approximately 2 mm. Note that, instead of the taper portion 52A, a step-shaped portion may be formed such that the step portion faces the recording tape T side, at the outer peripheral edge portion of the tape contacting layer 52.

Further, an overlapping portion 54, that serves as a holding portion and covers the taper portion 52A from the recording tape T side, is formed integrally with the flange main body 50. The overlapping portion 54 is formed of the same type of resin material as the flange main body 50, and is formed integrally with that flange main body 50 accompanying the injection molding of that flange main body 50. Due to this overlapping portion 54, the outer peripheral edge portion of the tape contacting layer 52 is prevented from contacting the recording tape T (the recording tape T that travels). A projecting height H, in the axial direction of the reel 10, of the overlapping portion 54 with respect to the flange main body 50 is set to be the same as or less than the thickness t of the tape contacting layer 52.

On the other hand, an inner peripheral edge portion 52B of the tape contacting layer 52 is nipped, in the axial direction of the reel 10, by the flange main body portion 50 (the upper flange 14, the lower flange 16) and an end surface of the cylindrical tube portion 20 (the hub 12). Due to this structure of nipping the inner peripheral edge portion 52B, the inner peripheral edge portion of the tape contacting layer 52 is prevented from contacting the recording tape T (the recording tape T that travels).

In this embodiment, compression of the tape contacting layer 52 is prevented or suppressed by providing a spacer portion 56, that has a thickness (height) that is about equal to the thickness t of the tape contacting layer 52, between the cylindrical tube portion 20 and the flange main body 50. In the example of FIG. 1, the spacer portion 56 is formed integrally with the cylindrical tube portion 20, but the spacer portion 56 may be formed integrally with the flange main body 50. Further, in the structure in which the hub 12 and the upper flange 14, the lower flange 16 are joined by the screws 36 as described above, the nipping interval of the tape contacting layer 52 is determined at portion other than that nipped region. In this structure, compression of the tape contacting layer 52 can be prevented or suppressed without providing the spacer portion 56.

Due thereto, at the reel 10, the tape contacting layers 52 are formed and held at the surfaces, at the sides that contact the recording tape T, of the upper flange 14 and the lower flange 16 respectively.

Figure 7:
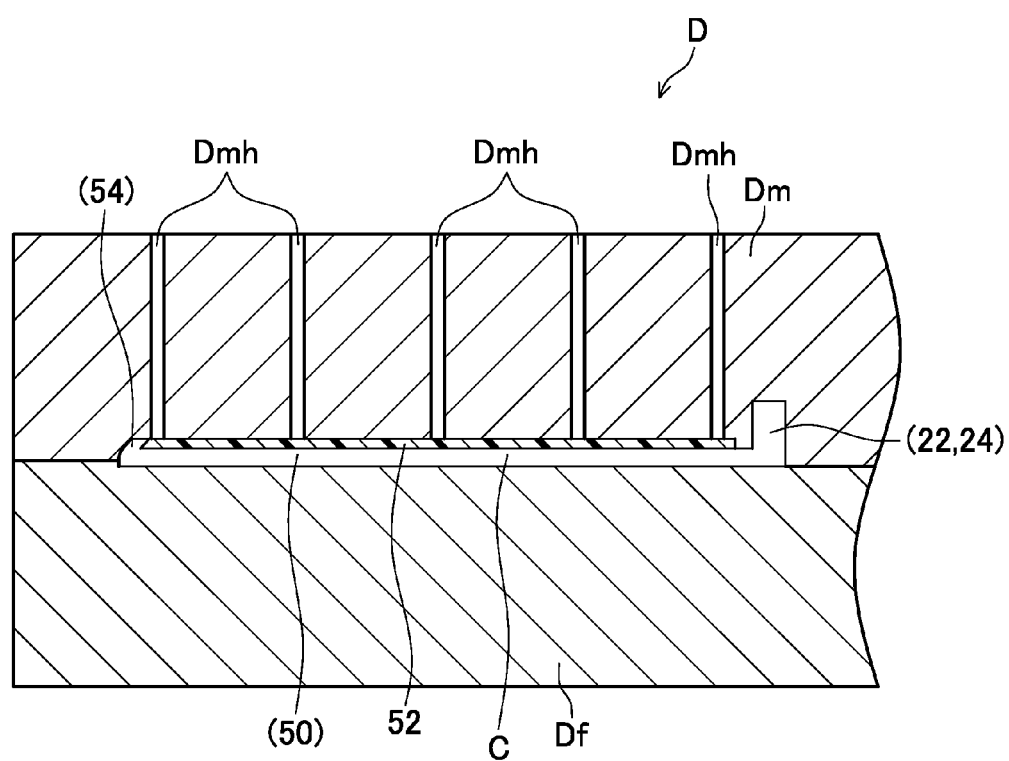
FIG. 7 is a cross-sectional view showing a mold for manufacturing the flange that structures the reel relating to the first embodiment of the present invention.

The method of manufacturing the overlapping portion 54 that holds the tape contacting layer 52 will be supplementarily described with reference to FIG. 7. A mold D for forming the upper flange 14, the lower flange 16 is illustrated schematically in FIG. 7. The mold D forms the upper flange 14, the lower flange 16 due to a resin material being filled into a cavity C that is formed by a fixed mold Df and a movable mold Dm.

At the time of forming the upper flange 14, the lower flange 16, before the resin material is filled into the cavity C, the tape contacting layer 52, that is formed in advance in an annular form having the taper portion 52A at the outer peripheral edge portion thereof, is set at the movable mold Dm. The tape contacting layer 52 is held at the movable mold Dm due to suction by air through suction holes Dmh that are formed in the movable mold Dm. When the resin material is filled into the cavity C in this state, the overlapping portion 54 is formed integrally with the flange main body 50 so as to cover the taper portion 52A from the recording tape T side.

(Structure of Tape Guide)

Figure 5:
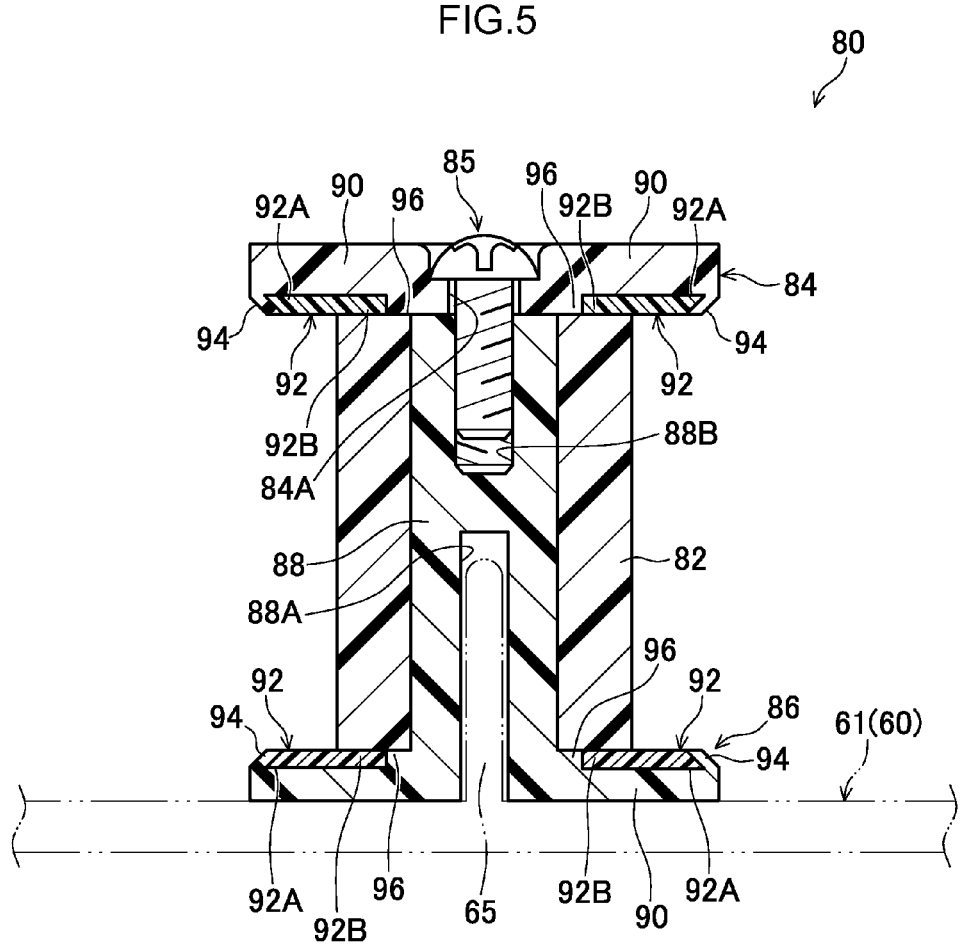
FIG. 5 is a cross-sectional view of a tape guide relating to the first embodiment of the present invention.

As shown in FIG. 5, the tape guide 80 is structured by an upper flange 84, a lower flange 86 being provided at axial direction both sides of a hub 82 around which the recording tape T is trained. The hub 82 is formed in the shape of a cylindrical tube. A boss 88, which is internally fit-together with the hub 82, is formed integrally with the lower flange 86.

Due to a supporting shaft 65 of the drive device 60 being inserted into a shaft hole 88A that is formed in the lower portion of the boss 88, the boss 88 is supported at this supporting shaft 65 so as to rotate freely. A female screw portion 88B is formed in the upper portion of the boss 88. The upper flange 84 is fixed to the boss 88 due to a screw 85, which is passed-through a through-hole 84A of the upper flange 84, being screwed-together with the female screw portion 88B. In this state, the hub 82 is nipped-in in the axial direction by the upper and lower flanges 84, 86.

In this embodiment, the hub 82 rotates coaxially and integrally with the upper and lower flanges 84, 86, but the hub 82 may be structured so as to rotate relative to the upper and lower flanges 84, 86. The respective parts of the above-described tape guide 80 are structured of a resin material such as polyacetal (POM), acrylonitrile butadiene styrene (ABS), or the like.

Further, the upper flange 84, the lower flange 86 that structure the tape guide 80 are structured by a tape contacting layer 92 being provided at the recording tape T side surfaces of flange main bodies 90 respectively.

The flange main body 90 in this embodiment is interpreted as not only the portion that restricts the recording tape T at the upper flange 84, the lower flange 86, but also includes the portion that overlaps an axial direction end surface of the hub 82.

The tape contacting layer 92 is structured by an annular sheet material, that is formed of a resin material that is flexible as compared with the resin material (POM, ABS, or the like) that structures the flange main body 90, being held at the flange main body 90. The sheet material that structures the tape contacting layer 92 can be made to be, for example, an ultrahigh molecular weight polyethylene (PE). This resin material is not compatible with the resin material (PC or the like) that structures the flange main body 90. Hereinafter, the structure of holding the tape contacting layer 92 with respect to the flange main body 90 is described.

As shown in FIG. 4, the outer peripheral edge portion of the tape contacting layer 92 is made to be a taper portion 92A whose outer diameter is a smaller diameter at the recording tape T side than at the flange main body 90 side. The taper portion 92A faces both the recording tape T side and the radial direction outer side. Note that, instead of the taper portion 92A, a step-shaped portion may be formed such that the step portion faces the recording tape T side, at the outer peripheral edge portion of the tape contacting layer 92. An overlapping portion 94, that serves as a holding portion and covers the taper portion 92A from the recording tape T side, is formed integrally with the flange main body 90. Due to this overlapping portion 94, the outer peripheral edge portion of the tape contacting layer 92 is prevented from contacting the recording tape T (the recording tape T that travels). Although not illustrated, in the same way as the overlapping portion 54 of the reel 10, the projecting height, in the axial direction of the reel 10, of the overlapping portion 94 with respect to the flange main body 90 is set to be equal to or less than the thickness of the tape contacting layer 92.

On the other hand, an inner peripheral edge portion 92B of the tape contacting layer 92 is nipped, in the axial direction of the tape guide 80, by the flange main body portion 90 (the upper flange 84, the lower flange 86) and an end surface of the hub 82. Due to this structure of nipping the inner peripheral edge portion 92B, the inner peripheral edge portion of the tape contacting layer 92 is prevented from contacting the recording tape T (the recording tape T that travels).

In this embodiment, compression of the tape contacting layer 92 is prevented or suppressed by providing a spacer portion 96, that has a thickness (height) that is about equal to the thickness t of the tape contacting layer 92, between the hub 82 and the flange main body 90. In the example of FIG. 1, the spacer portion 96 is formed integrally with the flange main body 90 (the upper flange 84, the lower flange 86), but the spacer portion 96 may be formed integrally with the hub 82.

Due thereto, at the reel 10, the tape contacting layers 92 are formed and held at the surfaces, at the sides that contact the recording tape T, of the upper flange 84 and the lower flange 86 respectively. The method of manufacturing the overlapping portion 94 that holds the tape contacting layer 92 is basically a method of setting the tape contacting layer 92 within the cavity of a mold and filling a resin material into this cavity, and is the same as the case of the reel 10, and therefore, description thereof is omitted.

Operation of the present embodiment is described next.

At times of winding the recording tape T around the reel 10F for draw-out, the reel plate 46 is attracted by the magnet and the driving gear is meshed-together with the reel gear 44, and this reel 10F is set at the winding device. Next, the leading end of the unrecorded recording tape T is made to be held at the cylindrical tube portion 20 of the hub 12, the winding device is operated, and the reel 10 is rotated and driven. After the recording tape T is wound around the reel 10F, the other end of the recording tape T is made to be held at the cylindrical tube portion 20 of the reel 10T.

Then, the pair of reels 10F, 10T are assembled into the drive device 60, and these reels 10F, 10T are fixed to the rotating members 64 by the screws 38. Further, the recording tape T, that spans between the reels 10F, 10T, is trained around the hubs 82 of the respective tape guides 80.

In this drive device 60, at times of recording information onto the recording tape T, or playing-back information from the recording tape T, the reel 10F, the reel 10T are rotated and driven synchronously in opposite directions. Thereupon, the recording tape T travels on the traveling path that is defined by the tape guides 80, and information is written or information is read-out by the magnetic head 70.

At the time of traveling of the recording tape T in the above-described winding device and drive device 60, the recording tape T is guided at a predetermined tape path due to the upper flanges 14, the lower flanges 16 restricting the position in the transverse direction of the recording tape T.

(Operation/Effects of Reel)

Here, the tape contacting layers 52 that are formed of a flexible material are formed at the recording tape T side surfaces of the upper flange 14, the lower flange 16 of the reel 10. Therefore, even if the recording tape T contacts the upper flange 14, the lower flange 16 due to positional restriction that accompanies winding or traveling, the recording tape T is protected from such contact. Namely, wear of the transverse direction end portions (edges) of the recording tape T, and scraping-off of the tape substrate or coated substances (the generation of so-called debris) that accompanies this, are prevented or effectively suppressed.

In particular, when the winding speed or the traveling speed within the drive device 60 becomes high accompanying the recording tape T being made to be thin-walled or being made to be long, it is easy for the aforementioned wear of the transverse direction end portions (edges) of the recording tape T, and scraping-off of the tape substrate or coated substances that accompanies this, to occur. However, also under such conditions, at the reel 10, wear of the transverse direction end portions (edges) of the recording tape T, and scraping-off of the tape substrate or coated substances that accompanies this, can be suppressed effectively.

Further, at the reel 10, the above-described protecting of the edges of the recording tape T is realized by holding the tape contacting layers 52, that are not compatible with the flange main bodies 50, at the flange main bodies 50. Concretely, due to the taper portions 52A, that are outer peripheral edge portions of the tape contacting layers 52, being covered from the recording tape T sides by the overlapping portions 54, contact between the recording tape T, that is being wound or is traveling, and the outer peripheral edge portions of the tape contacting layers 52 is prevented. Accordingly, at the reel 10, the outer peripheral edge portions of the tape contacting layers 52 contacting the recording tape T and rolling-up, i.e., the tape contacting layers 52 peeling-off from the flange main bodies 50, is prevented or effectively suppressed.

On the other hand, at the reel 10, due to the inner peripheral edge portions 52B of the tape contacting layers 52 being nipped-in between the cylindrical tube portion 20 and the flange main bodies 50, contact between the recording tape T, that is being wound or is traveling, and the inner peripheral edge portions of the tape contacting layers 52 is prevented. Accordingly, at the reel 10, the inner peripheral edge portions of the tape contacting layers 52 contacting the recording tape T and rolling-up, i.e., the tape contacting layers 52 peeling-off from the flange main bodies 50, is prevented or effectively suppressed.

Further, at the reel 10, the overlapping portions 54 are structures that cover the taper portions 52A of the tape contacting layers 52 from the recording tape T side, and therefore, the function of holding the outer peripheral edge portions of the tape contacting layers 52 is realized by the overlapping portions 54 that are formed within the ranges of the thicknesses of the tape contacting layers 52. Further, because the overlapping portions 54 are formed integrally with the flange main bodies 50, the reel 10 that has the tape contacting layers 52 can be manufactured easily and with good accuracy.

Moreover, at the reel 10, the taper portions 52A of the tape contacting layers 52 are covered by the overlapping portions 54 over the entire lengths in the peripheral direction. Due thereto, at the entire peripheries of the upper flange 14, the lower flange 16, the outer peripheral edge portions of the tape contacting layers 52 contacting the recording tape T and rolling-up is prevented or effectively suppressed. Namely, the tape contacting layers 52 peeling-off from the flange main bodies 50 is prevented or effectively suppressed.

Due thereto, at the reel 10, in a structure in which the hub 12, around which the recording tape T is wound, and the upper flange 14 and the lower flange 16 rotate integrally, contact (interference) between the recording tape T and the overlapping portions 54 or the edges of the tape contacting layers 52 can be prevented or effectively suppressed. In other words, in a structure in which the recording tape T traverses the outer peripheral edges of the upper flange 14, the lower flange 16 along the entire peripheries thereof, contact (interference) between the recording tape T and the overlapping portions 54 or the edges of the tape contacting layers 52 can be prevented or effectively suppressed.

Further, at the reel 10, there is a structure in which the load of fastening the hub 12 and the upper flange 14, the lower flange 16 by the screws 36 is not applied to the portions that nip the inner peripheral edge portions 52B of the tape contacting layers 52 by the cylindrical tube portion 20 and the flange main bodies 50. Namely, at the spacer portions 56 or the regions fastened by the screws 36, the intervals between the cylindrical tube portion 20 and the flange main bodies 50, which nip the inner peripheral edge portions 52B of the tape contacting layers 52, are defined. Therefore, unnecessary compressive load being applied to the tape contacting layers 52 is prevented or effectively suppressed, and the surface accuracies, at the recording tape T sides, of the tape contacting layers 52 are ensured.

(Operation/Effects of Tape Guide)

Further, here, at the tape guide 80, the tape contacting layers 92 that are formed from a flexible material are formed at the recording tape T side surfaces of the upper flange 84, the lower flange 86. Therefore, even if the recording tape T contacts the upper flange 84, the lower flange 86 due to positional restriction that accompanies traveling, the recording tape T is protected from such contact. Namely, wear of the transverse direction end portions (edges) of the recording tape T, and scraping-off of the tape substrate or coated substances (the generation of so-called debris) that accompanies this, are prevented or effectively suppressed.

In particular, when the traveling speed within the drive device 60 becomes high accompanying the recording tape T being made to be thin-walled or being made to be long, it is easy for the above-described wear of the transverse direction end portions (edges) of the recording tape T, and scraping-off of the tape substrate or coated substances that accompanies this, to occur. However, also under such conditions, at the tape guide 80, wear of the transverse direction end portions (edges) of the recording tape T, and scraping-off of the tape substrate or coated substances that accompanies this, can be suppressed effectively.

Further, at the tape guide 80, the above-described protecting of the edges of the recording tape T is realized by holding the tape contacting layers 92, which is not compatible with the flange main bodies 90, at the flange main bodies 90. Concretely, due to the taper portions 92A, that are these peripheral edge portions of the tape contacting layers 92, being covered from the recording tape T sides by the overlapping portions 94, contact between the recording tape T, that is being wound or is traveling, and the outer peripheral edge portions of the tape contacting layers 92 is prevented. Accordingly, at the tape guide 80, the outer peripheral edge portions of the tape contacting layers 92 contacting the recording tape T and rolling-up, i.e., the tape contacting layers 92 peeling-off from the flange main bodies 90, is prevented or effectively suppressed.

On the other hand, at the tape guide 80, due to the inner peripheral edge portions 92B of the tape contacting layers 92 being nipped-in between the hub 82 and the flange main bodies 90, contact between the recording tape T, that is being wound or is traveling, and the inner peripheral edge portions of the tape contacting layers 92 is prevented. Accordingly, at the tape guide 80, the inner peripheral edge portions of the tape contacting layers 92 contacting the recording tape T and rolling-up, i.e., the tape contacting layers 92 peeling-off from the flange main bodies 90, is prevented or effectively suppressed.

Further, at the tape guide 80, the overlapping portions 94 are structures that cover the taper portions 92A of the tape contacting layers 92 from the recording tape T side, and therefore, the function of holding the outer peripheral edge portions of the tape contacting layers 92 is realized by the overlapping portions 94 that are formed within the ranges of the thicknesses of the tape contacting layers 92. Further, because the overlapping portions 94 are formed integrally with the flange main bodies 90, the tape guide 80 that has the tape contacting layers 92 can be manufactured easily and with good accuracy.

Moreover, at the tape guide 80, the taper portions 92A of the tape contacting layers 92 are covered by the overlapping portions 94 over the entire lengths in the peripheral direction. Due thereto, at the entire peripheries of the upper flange 14, the lower flange 16, the outer peripheral edge portions of the tape contacting layers 92 contacting the recording tape T and rolling-up, i.e., the tape contacting layers 92 peeling-off from the flange main bodies 90, is prevented or effectively suppressed.

Due thereto, at the tape guide 80, in a structure in which the hub 12, around which the recording tape T is wound, and the upper flange 14 and the lower flange 16 rotate integrally, contact (interference) between the recording tape T and the overlapping portions 94 or the edges of the tape contacting layers 92 can be prevented or effectively suppressed. In other words, in a structure in which the recording tape T traverses the outer peripheral edges of the upper flange 14, the lower flange 16 along the entire peripheries thereof, contact (interference) between the recording tape T and the overlapping portions 94 or the edges of the tape contacting layers 92 can be prevented or effectively suppressed.

Further, at the tape guide 80, there is a structure in which the load of fastening the hub 12 and the upper flange 14, the lower flange 16 by the screws 36 is not applied to the portions that nip the inner peripheral edge portions 92B of the tape contacting layers 92 by the hub 82 and the flange main bodies 90. Namely, at the spacer portions 96 or the regions fastened by the screws 36, the intervals between the hub 82 and the flange main bodies 90, which nip the inner peripheral edge portions 92B of the tape contacting layers 92, are defined. Therefore, unnecessary compressive load being applied to the tape contacting layers 92 is prevented or effectively suppressed, and the surface accuracies, at the recording tape T sides, of the tape contacting layers 92 are ensured.

Moreover, at the tape guide 80, the degrees of freedom in selecting materials is increased by providing the tape contacting layers 92. Namely, it becomes possible to structure the tape guide 80, which has high rigidity (dimensional accuracy in an operating state), by using a material that has a high modulus of elasticity instead of, for example, POM or ABS that has relatively good slidability, and the like.

Second Embodiment

Figure 8:
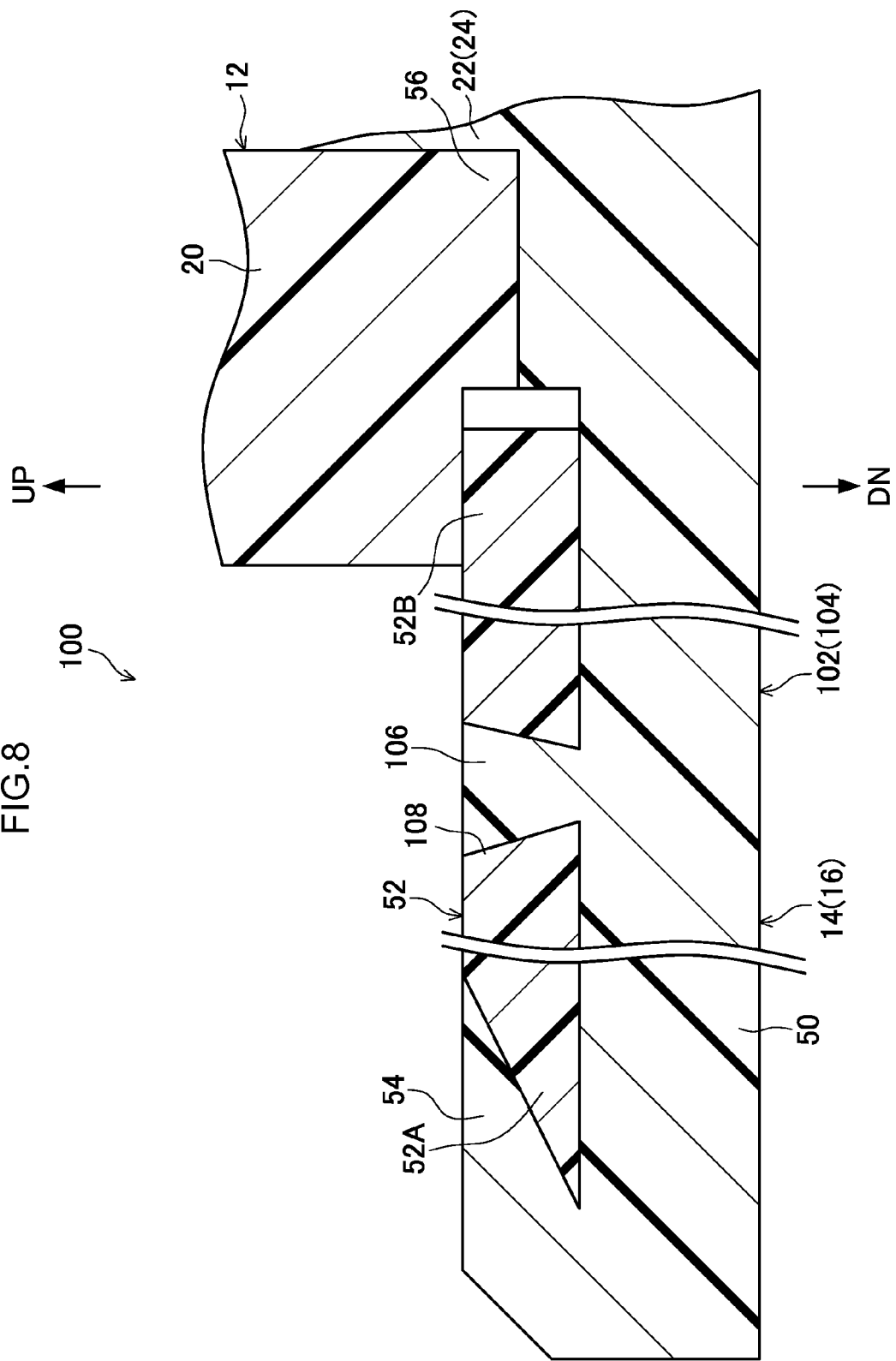
FIG. 8 is a cross-sectional view showing, in an enlarged manner, main portions of a reel relating to a second embodiment of the present invention.

A reel 100 that serves as a tape guiding member relating to a second embodiment of the present invention is described next on the basis of FIG. 8 and FIG. 9. Note that parts, portions that are basically the same as those of the above-described first embodiment are denoted by the same reference numerals as in the above-described first embodiment, and description thereof is omitted.

Figure 9:
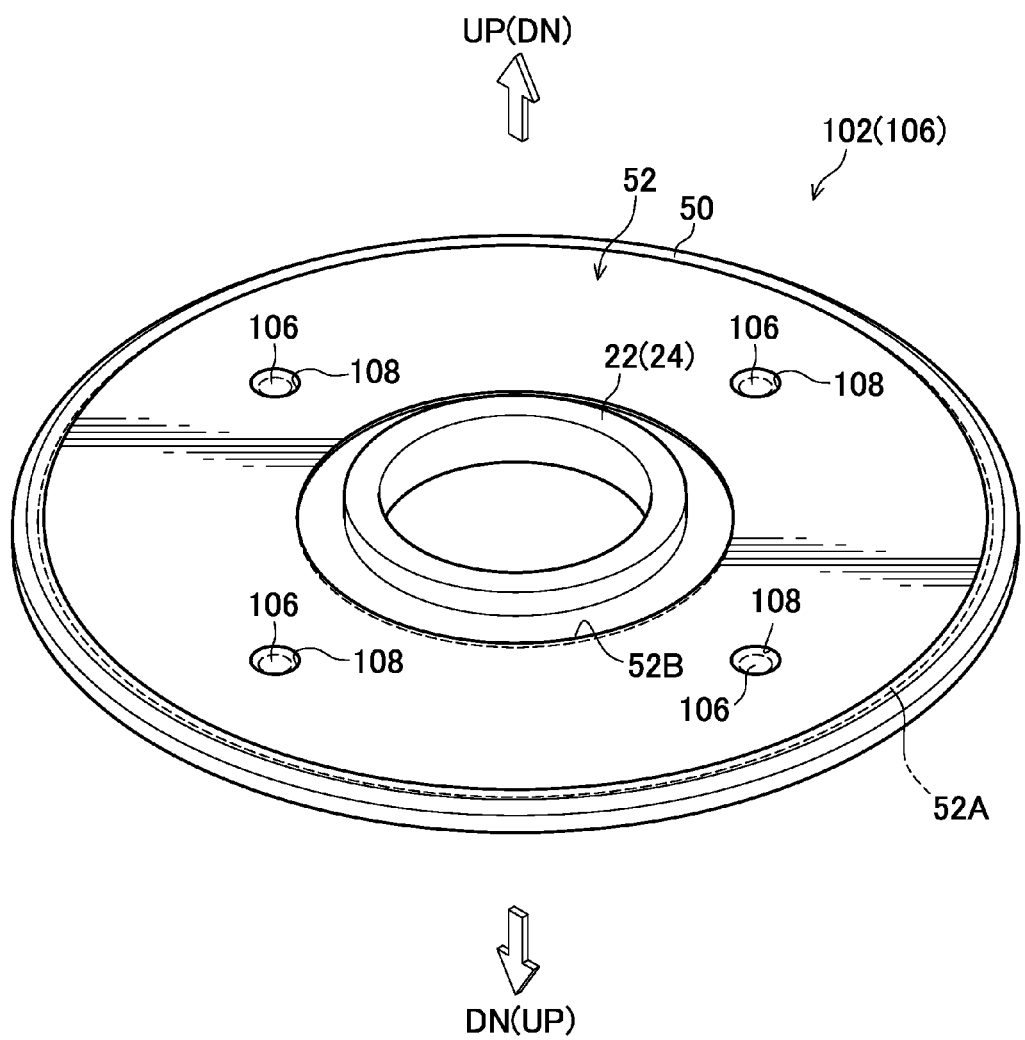
FIG. 9 is a perspective view of a flange that structures the reel relating to the second embodiment of the present invention.

An upper flange 102, a lower flange 104 that structure the reel 100 are shown in a perspective view in FIG. 9. As shown in this drawing, the upper flange 102, the lower flange 104 differ from the upper flange 14, the lower flange 16 with regard to the point that hole filling portions 106, that serve as fixing portions for fixing the tape contacting layer 52 to the flange main body 50, are provided in addition to the overlapping portion 54.

Concretely, plural (four in this embodiment) holes 108 for fixing that serve as pass-through holes are formed at uniform intervals in the peripheral direction in the tape contacting layer 52 that structures the reel 100. Further, as shown in FIG. 8, the interiors of the holes 108 for fixing are filled by the hole filling portions 106. The hole filing portions 106 are formed of the same type of resin material as the flange main body 50, and are formed integrally with that flange main body 50 accompanying the injection molding of that flange main body 50. In this embodiment, the holes 108 for fixing are made to be taper holes whose diameter is greater at the recording tape T side than at the flange main body 50 side. Note that stepped holes (having step portions that face the recording tape T side), whose diameter is greater at the recording tape T side than at the flange main body 50 side, may be used instead of taper holes.

Further, by filling the hole filling portions 106 into the holes 108 for fixing, the taper walls, that face toward the recording tape T side, of the holes 108 for fixing are covered from the recording tape T side. Due thereto, the hole filling portions 106 are structures that prevent separation in the thickness direction of the tape contacting layer 52 from the flange main body 50. In this embodiment, the hole filing portions 106, the holes 108 for fixing are disposed at the substantially intermediate portion between the overlapping portion 54 (the taper portion 52A) and the cylindrical tube portion 20 (the inner peripheral edge portion 52B) in the radial direction. The other structures of the reel 100, including portions that are not illustrated, are the same as corresponding structures of the reel 10.

Accordingly, in accordance with the reel 100 relating to the second embodiment as well, basically, effects that are similar can be obtained by operation that is similar to that of the reel 10 relating to the first embodiment. Further, in the reel 100, the tape contacting layer 52 is held at the flange main body 50 also by the hole filling portions 106, and therefore, peeling-off of that tape contacting layer 52 from the flange main body 50 is prevented or is suppressed more effectively. In particular, in a structure in which it is easy for problems to arise, such as the tape contacting layer 52 floating-up (loosening) from the flange main body 50 at the substantially intermediate portion between the overlapping portion 54 (the taper portion 52A) and the cylindrical tube portion 20 (the inner peripheral edge portion 52B) in the radial direction, or the like, such problems are prevented or effectively suppressed. Accordingly, for example, in a structure in which the difference between the inner and outer diameters of the flange is large, or the like, these problems are prevented or effectively suppressed.

Further, a resin material is filled into the holes 108 for fixing that are taper holes, and the hole filling portions 106 are formed. Therefore, the tape contacting layer 52 can be held at the flange main body 50 by the hole filing portions 106 that do not project-out toward the recording tape T side. Moreover, because the hole filling portions 106 are formed integrally with the flange main body 50, the reel 10 that has the tape contacting layer 52 can be manufactured easily and with good accuracy.

Note that the second embodiment illustrates an example in which the hole filling portions 106, the holes 108 for fixing are provided together with the overlapping portion 54 (the taper portion 52A), but the present invention is not limited to the same. For example, in a structure that does not have the overlapping portion 54, the outer peripheral side of the tape contacting layer 52 may be held at (fixed to) the flange main body 50 by the hole filling portions 106 and the holes 108 for fixing.

Third Embodiment

A reel 200 that serves as a tape guiding member relating to a third embodiment of the present invention is described next on the basis of FIG. 10 through FIG. 13. Note that parts, portions that are basically the same as those of the above-described first, second embodiments are denoted by the same reference numerals as in the above-described first, second embodiments, and description thereof is omitted.

Figure 10:
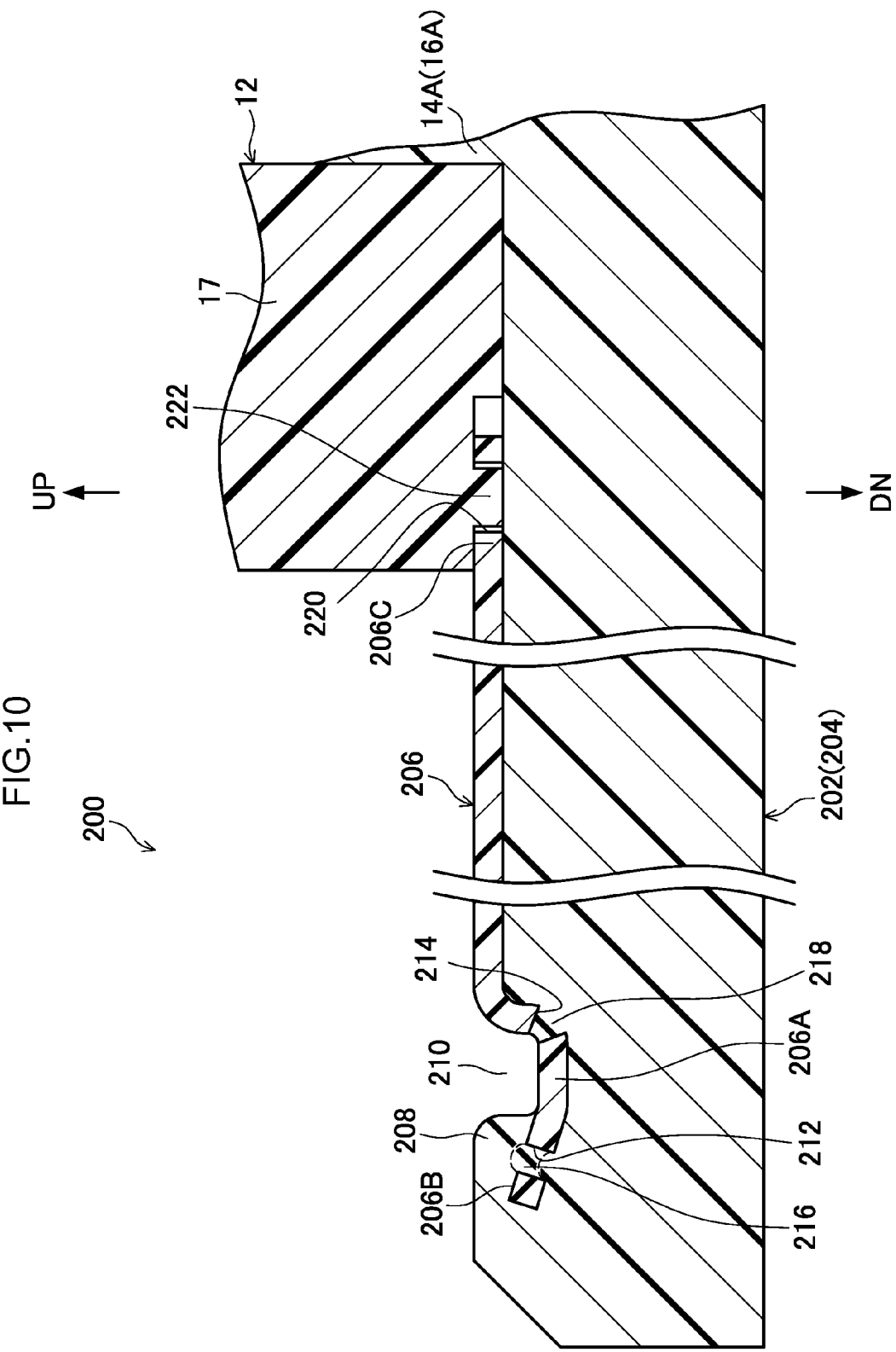
FIG. 10 is a cross-sectional view showing, in an enlarged manner, main portions of a reel relating to a third embodiment of the present invention.
Figure 11:
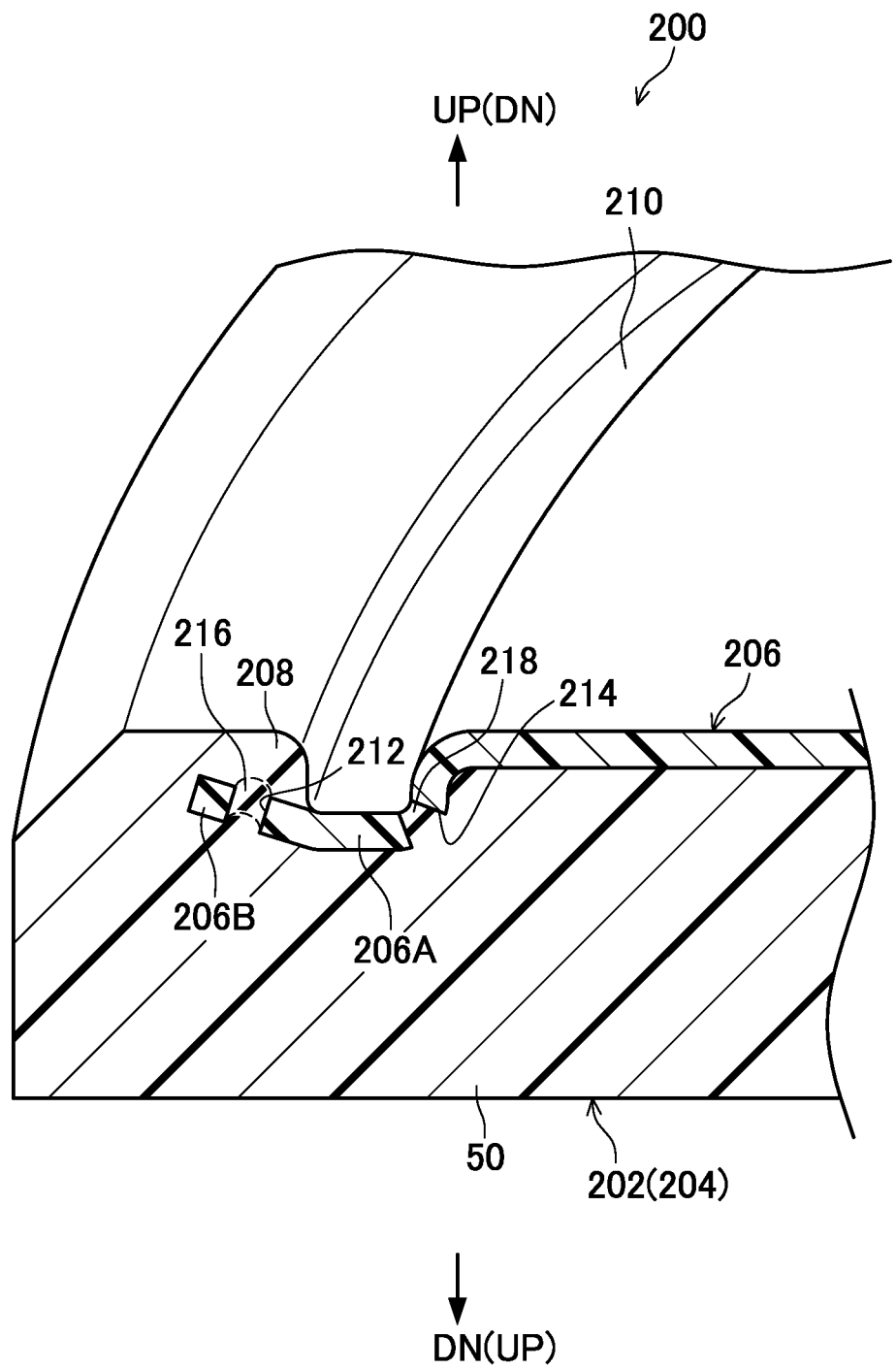
FIG. 11 is a perspective view, of which a portion is cut-out, showing, in an enlarged manner, main portions of the reel relating to the third embodiment of the present invention.

Main portions of the reel 200 are shown in FIG. 10 in a cross-sectional view corresponding to FIG. 1, and a portion of an upper flange 202, a lower flange 204 that structure the reel 200 is shown in a perspective view in FIG. 11. As shown in these drawings, the upper flange 202, the lower flange 204 differ from the upper flanges 14, 102, the lower flanges 16, 104 with respect to the point of having a tape contacting layer 206 instead of the tape contacting layer 52. Further, the upper flange 202, the lower flange 204 differ from the upper flanges 14, 102, the lower flanges 16, 104 with respect to the point that an annular groove 210 serving as a concave portion is formed adjacent to the inner peripheral side of an overlapping portion 208.

The sheet material that structures the tape contacting layer 206 is formed of, for example, an ultrahigh molecular weight polyethylene (PE), and, in this embodiment, the thickness t thereof is less than 0.5 mm. Therefore, the sheet material that structures the tape contacting layer 206 has low rigidity (low stiffness) as compared with the sheet material that structures the tape contacting layer 52. Further, it is difficult to form a taper corresponding to the taper portion 52A at the outer peripheral edge portion of a thin sheet material (in particular, the thickness t of less than or equal to 0.4 mm). Therefore, there is the concern that the tape contacting layer 206 cannot be held securely at the flange main body 50 merely by being nipped-in between the flange main body 50 and the overlapping portion 54 at the outer periphery, and the cylindrical tube portion 20 at the inner periphery.

In the reel 200, a structure that securely holds the tape contacting layer 206, that is formed by a thin-walled sheet material as described above, at the flange main body 50 is employed, and this point is described in detail hereinafter.

As shown in FIG. 11, a curved portion 206A, that serves as a bent portion that is bent so as to move apart from the recording tape T side at the outer peripheral edge portion, is formed at the tape contacting layer 206. The curved portion 206A is curved also so as to be further concave toward the recording tape T side. Further, the overlapping portion 208, that serves as a holding portion and that covers, from the recording tape T side, one portion 206B at the outer peripheral (distal end) side of the curved portion 206A, is formed integrally with the flange main body 50.

The overlapping portion 208 is formed of a resin material of the same type as the flange main body 50, and is formed integrally with that flange main body 50 accompanying the injection molding of that flange main body 50. The outer peripheral edge portion of the tape contacting layer 206 is prevented from contacting the recording tape T (the recording tape T that travels) due to this overlapping portion 208.

An annular groove 210 is formed at the inner peripheral side of this overlapping portion 208 with the portion, that is not covered by the overlapping portion 208, at the curved portion 206A of the tape contacting layer 206 being the groove bottom and a groove wall of the annular groove 210.

The annular groove 210 is formed as the trace of the contact with an annular convex portion Dr that is provided at a mold, in order to cause the outer peripheral edge portion of the sheet material that structures the tape contacting layer 206 to deform in the direction of moving away from the recording tape T.

Figure 13:
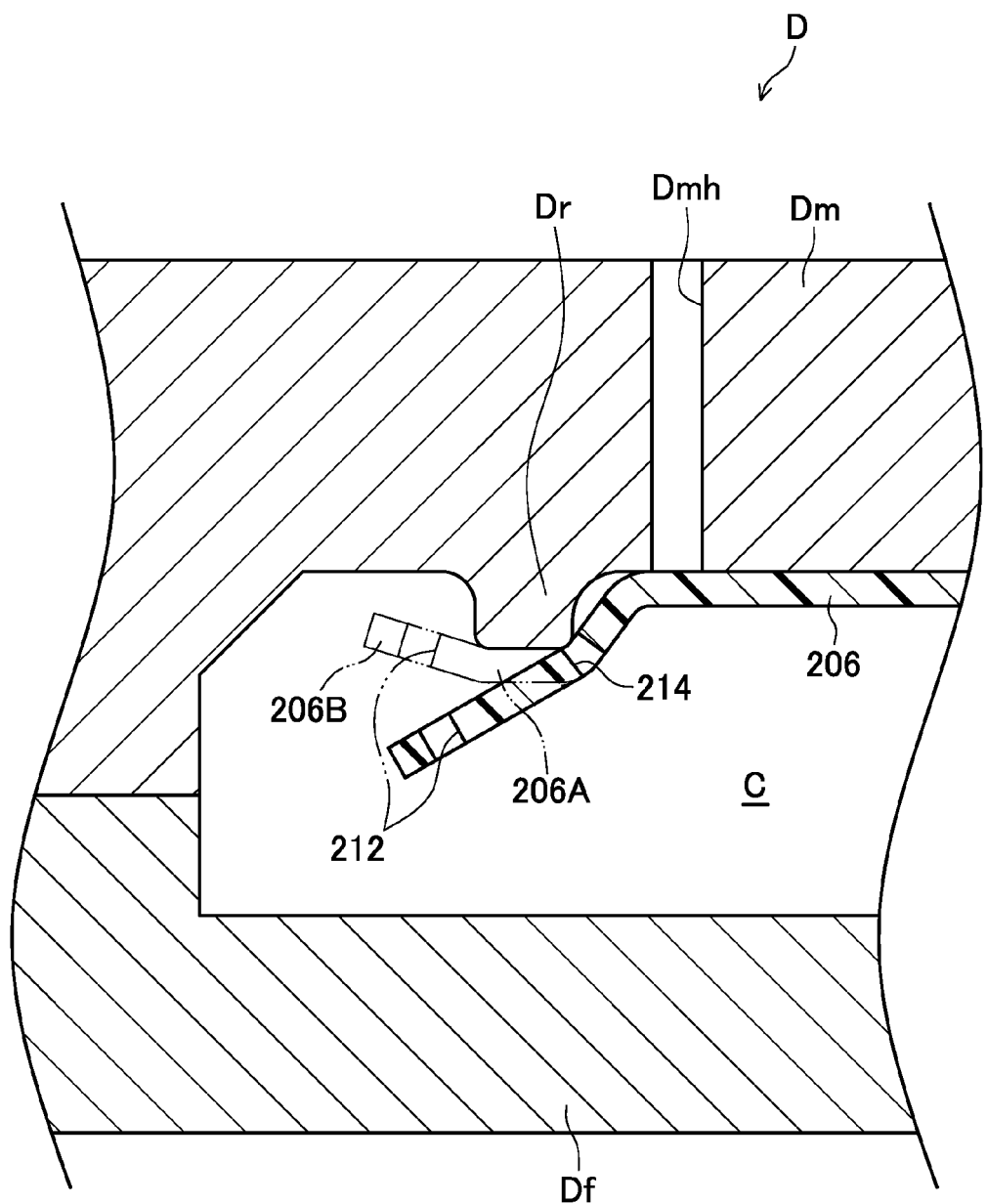
FIG. 13 is a cross-sectional view showing a mold for manufacturing a flange that structures the reel relating to the third embodiment of the present invention.

Concretely, as shown in FIG. 13, the annular convex portion Dr, that is contacted by a portion in the vicinity of the outer peripheral edge of the sheet material that structures the tape contacting layer 206, is formed at the movable mold Dm. In a state in which this sheet material and the annular convex portion Dr contact one another, when the resin material that structures the flange main body 50 is made to flow-in from the fixed mold Df side, due to the pressure of this resin material, the sheet material is pushed-against the annular convex portion Dr and is bent, as shown by the imaginary line in FIG. 13. Due thereto, the curved portion 206A is formed at the tape contacting layer 206. Further, the resin material, that finds its way around from the recording tape T side to the outer peripheral side one portion 206B of this curved portion 206A, becomes the overlapping portion 208. When the resin material hardens and is removed from the mold, the annular groove 210 remains in the upper flange 202, the lower flange 204 as the trace of the contact with the annular convex portion Dr.

Figure 12:
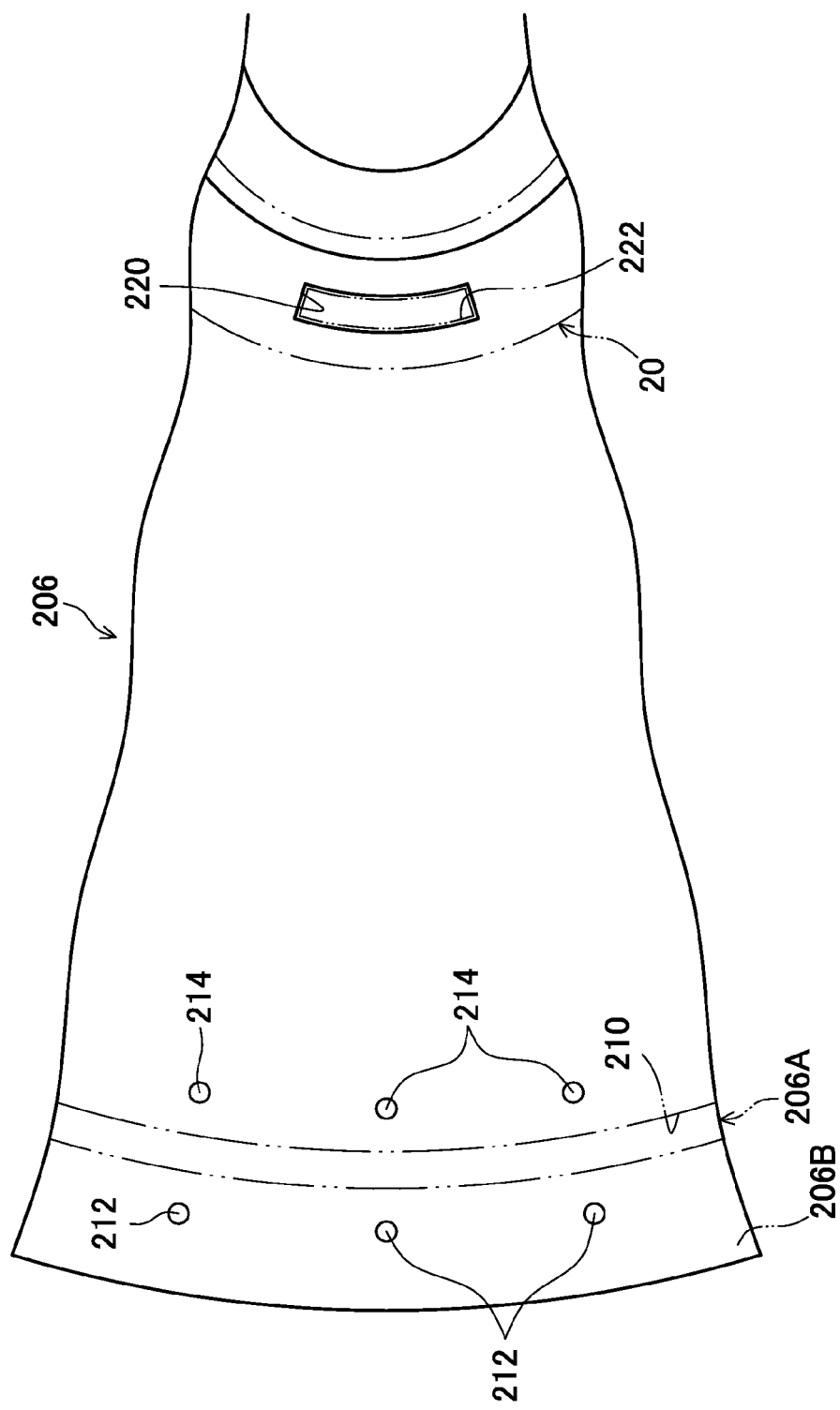
FIG. 12 is a plan view showing a portion of a sheet material that structures a tape contacting layer of the reel relating to the third embodiment of the present invention.

Further, as shown in FIG. 11 and FIG. 12, at the upper flange 202, the lower flange 204 that structure the reel 200, plural through-holes 212 are formed at uniform intervals in the peripheral direction in the curved portion 206A of the tape contacting layer 206. The through-holes 212 are formed in the outer peripheral side one portion 206B of the curved portion 206A that is covered by the overlapping portion 208. Moreover, at the upper flange 202 and the lower flange 204, plural through-holes 214 are formed at uniform intervals in the peripheral direction at the inner peripheral side with respect to the through-holes 212. The through-holes 214 are formed in a vicinity of the border with the general surface (the range that contacts the recording tape T that is wound around) of the tape contacting layer 206, at the curved portion 206A.

The resin material that structures the flange main body 50 is filled into the respective through-holes 212, 214, and, due thereto, hole filling portions 216, 218 that serve as fixing portions are formed in the upper flange 202, the lower flange 204 by the resin that has entered into the through-holes 212, 214. The hole filling portions 216 within the through-holes 212 connect the overlapping portion 208 and the flange main body 50.

Moreover, as shown in FIG. 10 and FIG. 12, at the upper flange 202 and the lower flange 204 that structure the reel 200, through-holes 220 are formed in an inner peripheral edge portion 206C that is nipped, in the thickness direction, in between the cylindrical tube portion 20 and the flange main body 50 at the tape contacting layer 206. As shown in FIG. 12, the through-holes 220 are made to be long holes that are long in the peripheral direction, and a plurality thereof are provided at uniform intervals in the peripheral direction.

On the other hand, ribs 222, that enter into the through-holes 220, are provided so as to project from the axial direction end surfaces of the cylindrical tube portion 20. Due to the ribs 222 being made to enter into the through-holes 220, the tape contacting layer 206 generating relative rotation with the cylindrical tube portion 20 at the inner peripheral side is suppressed. The other structures of the reel 200, including portions that are not illustrated, are the same as the corresponding structures of the reel 10.

Accordingly, in accordance with the reel 200 relating to the third embodiment as well, basically, effects that are similar can be obtained by operation that is similar to that of the reel 10 relating to the first embodiment. Further, in the reel 200, there is a structure in which the overlapping portion 208 covers an outer peripheral one portion of the curved portion 206A that is formed at the tape contacting layer 206, and therefore, the tape contacting layer 206 can be structured by using a thin-walled sheet material. Namely, it is difficult to form a taper such as the taper portion 52A at the end surface of a thin-walled sheet material, but, at the cylindrical tube portion 20, the sheet material is held at the flange main body 50 and the tape contacting layer 206 can be obtained, without forming a taper such as the taper portion 52A at the sheet material.

Further, at the reel 200, the flange main body 50 and the overlapping portion 208 are connected by the hole filling portions 216 at the through-holes 212 that are formed in the curved portion 206A of the tape contacting layer 206. Therefore, the outer peripheral edge portion of the tape contacting layer 206, that is thin-walled, coming-out from between the flange main body 50 and the overlapping portion 208 is prevented or effectively suppressed. Namely, in the case of a sheet material that is thin-walled and has low rigidity, when the holding force of the outer peripheral edge is insufficient, when load is received from the recording tape T at the radial direction intermediate portion or the like, the holding of the outer peripheral edge is released and it is easy for wrinkles or the like to arise.

In contrast, at the reel 200, the overlapping portion 208 and the flange main body 50 are connected at the hole filling portions 216 that pass-through the curved portion 206A. Therefore, the tape contacting layer 206 is held well at the flange main body 50, at the outer peripheral edge portion. Moreover, because the hole filling portions 218 are provided in the through-holes 214 as well, the tape contacting layer 206 is held even better at the flange main body 50, at the outer peripheral edge portion.

Moreover, at the reel 200, the ribs 222 of the hub 12 are placed in the through-holes 220 that are formed in the inner peripheral edge side of the tape contacting layer 206. Thus, the tape contacting layer 206 coming-out from between the flange main body 50 and the cylindrical tube portion 20 at the inner peripheral side is prevented or effectively suppressed. Namely, in the case of a sheet material that is thin-walled and has low rigidity, when the holding force of the inner peripheral edge is insufficient, when load is received from the recording tape T at the radial direction intermediate portion or the like, the holding of the inner peripheral edge is released and it is easy for wrinkles or the like to arise. In contrast, at the reel 200, because the ribs 222 are placed in the through-holes 220 as described above, the tape contacting layer 206 is held well at the flange main body 50 (and the hub 12), at the inner peripheral edge portion.

Still further, at the reel 200, at the time of molding the upper flange 202, the lower flange 204 thereof, the movable mold Dm at which the annular convex portion Dr is formed is used. Therefore, as described above, the overlapping portion 208 can be formed with respect to the tape contacting layer 206 that is thin-walled. Further, because the annular convex portion Dr is formed in a continuous annular form without breaks, the resin material, that finds its way around to the recording tape T side of the tape contacting layer 206 and structures the overlapping portion 208, is prevented from going-in further to as far as the portion contacting the recording tape T. Namely, in a structure in which the resin material finds its way around from the recording tape T side, excess resin material finding its way around to the recording tape T side is prevented or effectively suppressed.

Note that the third embodiment illustrates an example in which a structure of holding the inner peripheral edge by the through-holes 220 and the ribs 222 is applied to the tape contacting layer 206 that is formed from a thin-walled sheet material. However, the present invention is not limited to the same. The through-holes 220 and the ribs 222 may be used as, for example, a structure that holds the inner peripheral edge of the tape contacting layer 52 that is formed from a sheet material that is relatively thick-walled (highly rigid). In this case as well, the inner peripheral edge portion of the tape contacting layer 52 coming-out from between the cylindrical tube portion 20 and the flange main body 50 is prevented or effectively suppressed.

Further, the third embodiment illustrates an example in which the annular groove 210 (the annular convex portion Dr) is continuous along the entire periphery, but the present invention is not limited to the same. For example, there may be a structure in which plural concave portions are provided at uniform intervals (intermittently) in the peripheral direction. In this case as well, (the sum of) the lengths in the peripheral direction of the concave portions is desirably longer than (the sum of) the lengths in the peripheral direction of the portions between the concave portions.

Further, although the above-described respective embodiments illustrate examples in which the upper flange 14, 102, 202, the lower flange 16, 104, 204 rotate integrally with the hub 12, the present invention is not limited to the same. For example, the upper flange 14, 102, the lower flange 16, 104 may be structures that rotate relative to the hub 12. Concretely, there can be a structure in which the hub 12 rotates as the recording tape T is drawn-out and taken-up, and, on the other hand, rotation of the upper flange 14, 102, the lower flange 16, 104 is restricted. In this structure, the range in which the recording tape T traverses the upper flange 14, 102, the lower flange 16, 104 is limited. Therefore, the overlapping portion 54 that holds the tape contacting layer 52 may be provided within the range of the thickness of the tape contacting layer 52 within this limited range, and, at the other portions, the overlapping portion 54, that projects-out further toward the recording tape T side than the tape contacting layer 52, may be provided. Further, the tape contacting layer 52 may be provided at only the portions, at the upper flange 14, 102, the lower flange 16, 104, at which the recording tape T travels while apart from (the recording tape T that is in the posture of being wound around) the hub.

Moreover, although the above-described respective embodiments illustrate examples in which the drive device 60 has the tape guides 80, the present invention is not limited to the same. For example, a tape guide that is not included in the present invention may be used instead of some of or all of the plural tape guides 80.

Further, the above-described respective embodiments illustrate examples in which the tape contacting layers 52 are provided respectively at the flanges 14, 16, 84, 86, 102, 104, 202, 204 at the both sides with respect to the hub 12, 82, but the present invention is not limited to the same. For example, there may be a structure in which the tape contacting layer 52 is provided only at the flange at one side with respect to the hub 12. Or, in a structure in which a flange is provided at only one side with respect to the hub 12, there may be a structure in which the tape contacting layer 52 is provided at that flange.

Still further, although the above-described respective embodiments illustrate examples in which the flange main body 50, the overlapping portion 94, the hole filling portions 106 are structured of a resin material, the present invention is not limited to the same. For example, the flange main body 50, the overlapping portion 94, the hole filling portions 106 may be structured by a metal material such as aluminum or an alloy thereof or the like, or by another material.

What is claimed is:

1. A tape guiding member comprising:
   a hub around which a recording tape is wound or is trained;
   a flange main body that holds the recording tape at upper and lower edges of the recording tape, that restricts a position in a transverse direction of the recording tape, and that comprises an inner peripheral edge portion and an outer peripheral edge portion, the flange main body contacting the hub at the inner peripheral edge portion;
   a tape contacting layer that is formed in a shape of a sheet of a material that is different from a material that structures the flange main body, and that is superposed on a surface, which contacts with the recording tape, of the flange main body, the tape contacting layer extending along a radial direction of the flange main body from the inner peripheral edge portion to the outer peripheral edge portion of the flange main body such that an in-plane direction of the tape contacting layer conforms to an in-plane direction of an upper reel flange or a lower reel flange; and
   a holding portion that is provided at the outer peripheral edge portion of the flange main body, and covers an outer peripheral edge portion of the tape contacting layer, and holds the tape contacting layer at the flange main body.

2. The tape guiding member of claim 1, wherein
   at the outer peripheral edge portion of the tape contacting layer, the flange main body side has a larger diameter than the recording tape side, and
   the holding portion is provided within a range of a thickness of the tape contacting layer.

3. The tape guiding member of claim 1, wherein
   the outer peripheral edge portion of the tape contacting layer is made to be a bent portion that is bent in a direction of moving away from the recording tape side, and
   the holding portion holds the tape contacting layer at the flange main body by covering the bent portion of the tape contacting layer from the recording tape side.

4. The tape guiding member of claim 3, wherein a concave portion, that is formed by recessing the tape contacting layer, is formed continuously or intermittently along a peripheral direction, adjacent to a radial direction inner side of the holding portion.

5. The tape guiding member of claim 1, wherein the holding portion covers the outer peripheral edge portion of the tape contacting layer from the recording tape side over an entire periphery.

6. The tape guiding member of claim 1, wherein
   the flange main body is formed of a resin material, and
   the holding portion is formed integrally with the flange main body of a same type of resin material as the flange main body.

7. The tape guiding member of claim 6, wherein
   through-holes are formed in a portion, that is covered by the holding portion, of the tape contacting layer, and
   the resin material that structures the flange main body is placed in the through-holes.

8. The tape guiding member of claim 1, wherein an inner peripheral edge portion of the tape contacting layer is nipped, in a thickness direction, between an axial direction end surface of the hub and the flange main body.

9. The tape guiding member of claim 8, wherein
   the hub and the flange main body are formed as separate bodies and are joined to one another, and the tape guiding member further comprises a spacer portion that defines an interval, in the thickness direction, between the axial direction end surface of the hub and the flange main body in a state in which the hub and the flange main body are joined, to be equal to a thickness of the tape contacting layer.

10. The tape guiding member of claim 1, further comprising a fixing portion that is provided at the flange main body, and that fixes the tape contacting layer to the flange main body by entering into through-holes that pass-through the tape contacting layer in a thickness direction.

11. The tape guiding member of claim 10, wherein
the flange main body is structured of a resin material, and
the fixing portion is formed integrally with the flange main body, of a same resin material as the flange main body.

12. The tape guiding member of claim 11, wherein
at the tape contacting layer, at least a portion of hole walls of the through-holes are made to be an inclined portion or a stepped portion that faces toward the recording tape side, and
the fixing portion is structured by a resin material that is filled into the holes.

13. The tape guiding member of claim 1, wherein the in-plane direction of the tape contacting layer is an in-plane direction of a surface of the tape contacting layer facing a space between the upper and lower reel flanges.

14. A tape guiding member comprising:
a hub around which a recording tape is wound or is trained;
a flange main body that holds the recording tape at the upper and lower edges of the recording tape, that restricts a position in a transverse direction of the recording tape, and that comprises an inner peripheral edge portion and an outer peripheral edge portion, the flange main body contacting the hub at the inner peripheral edge portion;
a tape contacting layer that is formed in a shape of a sheet of a material that is different from a material that structures the flange main body, and that is superposed on a surface, which contacts with the recording tape, of the flange main body, the tape contacting layer extending along a radial direction of the flange main body from the inner peripheral edge portion to the outer peripheral edge portion of the flange main body such that an in-plane direction of the tape contacting layer conforms to an in-plane direction of an upper reel flange or a lower reel flange; and
a fixing portion that is provided at the flange main body, and that fixes the tape contacting layer to the flange main body by entering into through-holes that pass-through the tape contacting layer in a thickness direction.

15. The tape guiding member of claim 14, wherein
the flange main body is formed of a resin material, and
the fixing portion is formed integrally with the flange main body of a same resin material as the flange main body.

16. The tape guiding member of claim 15, wherein
at the tape contacting layer, at least a portion of hole walls of the through-holes are made to be an inclined portion or a stepped portion that faces toward the recording tape side, and
the fixing portion is structured by a resin material that is filled into the holes.

17. The tape guiding member of claim 14, wherein the in-plane direction of the tape contacting layer is an in-plane direction of a surface of the tape contacting layer facing a space between the upper and lower reel flanges.

* * * * *